(12) United States Patent
Uto et al.

(10) Patent No.: US 10,732,332 B2
(45) Date of Patent: Aug. 4, 2020

(54) LIGHT SOURCE UNIT

(71) Applicant: Toray Industries, Inc., Tokyo (JP)

(72) Inventors: Takayuki Uto, Otsu (JP); Wataru Gouda, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/344,109

(22) PCT Filed: Oct. 11, 2017

(86) PCT No.: PCT/JP2017/036842
§ 371 (c)(1),
(2) Date: Apr. 23, 2019

(87) PCT Pub. No.: WO2018/083953
PCT Pub. Date: May 11, 2018

(65) Prior Publication Data
US 2020/0064528 A1    Feb. 27, 2020

(30) Foreign Application Priority Data
Nov. 7, 2016   (JP) .................................. 2016-216898

(51) Int. Cl.
*G02B 5/08* (2006.01)
*G02B 5/20* (2006.01)
(Continued)

(52) U.S. Cl.
CPC .......... *G02B 5/0833* (2013.01); *G02B 5/208* (2013.01); *G02B 6/005* (2013.01); *G02B 6/0055* (2013.01);
(Continued)

(58) Field of Classification Search
None
See application file for complete search history.

(56) References Cited

U.S. PATENT DOCUMENTS

| 5,882,774 A | 3/1999 | Jonza et al. |
| 9,452,590 B2 | 9/2016 | Uto et al. |

(Continued)

FOREIGN PATENT DOCUMENTS

| JP | 2001164245 A | 6/2001 |
| JP | 2007273440 A | 10/2007 |

(Continued)

OTHER PUBLICATIONS

International Search Report and Written Opinion for International Application No. PCT/JP2017/036842, dated Dec. 25, 2017—8 pages.

(Continued)

*Primary Examiner* — Ashok Patel
(74) *Attorney, Agent, or Firm* — RatnerPrestia

(57) ABSTRACT

A light source unit is provided which makes an excellent contrast between the black display portions and the white display portions if mounted on a display, while having a high frontal luminance. The light source unit includes: a light source; a color conversion material that converts incident light from the light source into light having a longer wavelength than the incident light; and a reflective film that exists between the light source and the color conversion material and that transmits light from the light source incident perpendicularly on the film surface and reflects light from the color conversion material incident perpendicularly on the film surface; wherein the P-Polarized light of the light incident from the light source on the reflective film surface at an angle of 20°, 40°, and 60° is reflected at a reflectance of R20(%), R40(%), and R60(%) respectively, which satisfy R20<R40<R60.

14 Claims, 4 Drawing Sheets

(51) Int. Cl.
  *F21V 8/00* (2006.01)
  *G02F 1/13357* (2006.01)
(52) U.S. Cl.
  CPC ..... *G02B 6/0056* (2013.01); *G02F 1/133605* (2013.01); *G02F 1/133603* (2013.01); *G02F 2001/133614* (2013.01)

(56) References Cited

U.S. PATENT DOCUMENTS

| | | | |
|---|---|---|---|
| 2004/0144987 A1 | 7/2004 | Ouderkirk et al. | |
| 2004/0145895 A1* | 7/2004 | Ouderkirk | H01L 33/46 362/260 |
| 2009/0079909 A1* | 3/2009 | Ouderkirk | B29C 55/023 349/67 |
| 2009/0147497 A1 | 6/2009 | Nada | |
| 2010/0165660 A1 | 7/2010 | Weber et al. | |
| 2014/0368766 A1 | 12/2014 | Shibata et al. | |
| 2016/0195659 A1 | 7/2016 | Johnson et al. | |
| 2019/0103521 A1 | 4/2019 | Umehara et al. | |

FOREIGN PATENT DOCUMENTS

| | | |
|---|---|---|
| JP | 2007307893 A | 11/2007 |
| JP | 2009140822 A | 6/2009 |
| JP | 2009143236 A | 7/2009 |
| JP | 2011241160 A | 12/2011 |
| JP | 2012022028 A | 2/2012 |
| JP | 2014067580 A | 4/2014 |
| JP | 2015065142 A | 4/2015 |
| JP | 2016534407 A | 11/2016 |
| WO | 2013002130 A1 | 1/2013 |
| WO | 2013118653 A1 | 8/2013 |
| WO | 2016148141 A1 | 9/2016 |
| WO | 2016186158 A1 | 11/2016 |
| WO | 2017164155 A1 | 9/2017 |

OTHER PUBLICATIONS

Extended European Search Report for European Application No. 17 867 291.1, dated Mar. 24, 2020, 9 pages.

* cited by examiner

LIGHT SOURCE UNIT

CROSS-REFERENCE TO RELATED APPLICATIONS

This is the U.S. National Phase application of PCT/JP2017/036842, filed Oct. 11, 2017, which claims priority to Japanese Patent Application No. 2016-216898, filed Nov. 7, 2016, the disclosures of these applications being incorporated herein by reference in their entireties for all purposes.

FIELD OF THE INVENTION

The present invention relates to a light source unit including a light source, a color conversion material, and a reflective film.

BACKGROUND OF THE INVENTION

Application of a multicoloring technique by a color conversion method to liquid crystal displays, organic EL displays, lighting apparatuses, and the like is being energetically studied. Color conversion means converting light emitted from a light-emitting body into light having a longer wavelength and means converting blue light emission into green or red light emission, for example.

A composition having this color conversion function is formed into a sheet and combined with, for example, a blue light source, whereby the three primary colors of blue, green, and red can be extracted, that is, white light can be extracted from the blue light source. A white light source obtained by combining the blue light source and the sheet having the color conversion function forms a backlight unit, and this backlight unit, a liquid crystal drive part, and color filters are combined, whereby a full-color display can be produced. Without the liquid crystal drive part, the unit can be used as a white light source as it is, which can be used as the white light source such as LED lighting.

Improvement in color reproducibility is a problem in liquid crystal displays using the color conversion method. Narrowing the half width of the respective emission spectra of blue, green, and red of the backlight unit to increase the color purity of each of blue, green, and red is effective in improving color reproducibility. To solve this problem, developed is a technique that uses quantum dots formed of inorganic semiconductor fine particles as a component of the color conversion material (refer to Patent Literature 1, for example). Although the technique using the quantum dots is indeed narrow in the half width of green and red emission spectra to improve color reproducibility, the quantum dots are vulnerable to heat, and moisture and oxygen in the air and are thus deficient in durability on the other hand.

Also developed is a technique that uses an organic or inorganic luminous material as a component of the color conversion material in place of the quantum dots. Disclosed as examples of the technique that uses an organic luminous material as the component of the color conversion material are one that uses a coumarin derivative (refer to Patent Literature 2, for example), one that uses a rhodamine derivative (refer to Patent Literature 3, for example), and one that uses a pyrromethene derivative (refer to Patent Literature 4, for example).

There is also another problem in that, although using the quantum dots technology and a color conversion material composed of an organic or inorganic luminous material improves color reproducibility, the color characteristics and the light emission characteristics of the color conversion material cause the luminance to decrease. For example, one solution to this problem is disclosed, wherein a light-wavelength-selective reflective film that reflects light emitted from a color conversion material is used (refer to Patent Literature 5, for example).

PATENT LITERATURE

Patent Literature 1: JP 2012-22028 A
Patent Literature 2: JP 2007-273440 A
Patent Literature 3: JP 2001-164245 A
Patent Literature 4: JP 2011-241160 A
Patent Literature 5: JP 2009-140822 A

SUMMARY OF THE INVENTION

In recent years, one technology has been used wherein, depending on the image on a screen, part of LEDs are partially turned off in order to improve the whitish color when the black is displayed on a liquid crystal display. However, light from a light source travels divergently toward a person who sees the light, which means that the light is emitted not only in the frontal direction but also in oblique directions, and accordingly, the light leaks divergently into the portions in which the light of the light source is originally turned off to display a black color, posing problems in that the contrast is worsened between the black display portions and the white display portions and that the frontal luminance is also reduced.

In view of this, the present invention is to solve the above-mentioned problems, and an object of the present invention is to provide a light source unit which makes an excellent contrast between the black display portions and the white display portions and at the same time, has a high frontal luminance, when mounted on a display.

The present invention is intended to solve the above-mentioned problems, and is a light source unit including: a light source; a color conversion material that converts incident light from the light source into light having a longer wavelength than the incident light; and a reflective film that exists between the light source and the color conversion material and that transmits light from the light source incident perpendicularly on the film surface and reflects light from the color conversion material incident perpendicularly on the film surface; wherein the P-Polarized light of the light incident from the light source on the reflective film surface at an angle of 20°, 40°, and 60° is reflected at a reflectance of R20(%), R40(%), and R60(%) respectively, which satisfy R20<R40<R60.

The present invention makes it possible to obtain a light source unit which makes an excellent contrast between black display and white display and at the same time, has high luminance.

DETAILED DESCRIPTION OF EMBODIMENTS OF THE INVENTION

Below, embodiments of the present invention will be described in detail, but the present invention is not to be construed as limited to the embodiments including the below-mentioned Examples, and a variety of modifications are obviously possible to the extent that they can achieve objects of the invention and do not depart from the gist of the invention.

Figure 1:
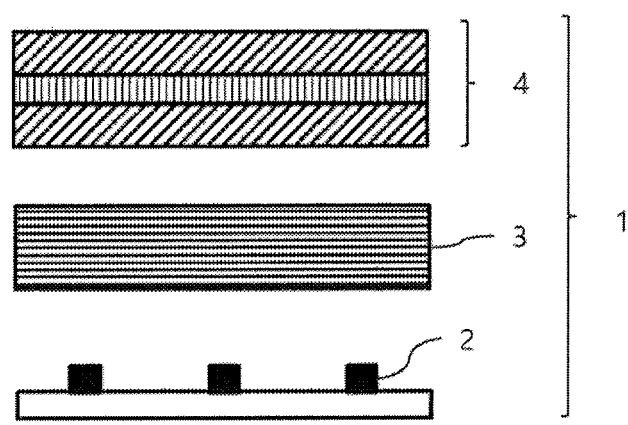
FIG. 1 is a schematic cross-sectional view showing an example of the light source unit according to the present invention.
Figure 2:
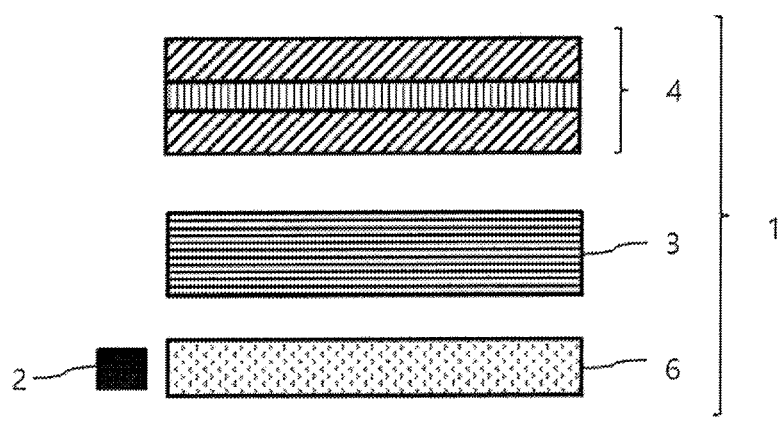
FIG. 2 is a schematic cross-sectional view showing an example of the light source unit according to the present invention.

The light source unit according to the present invention includes a light source, a color conversion material, and a reflective film, as shown in FIG. 1, and the reflective film needs to exist between the light source and the color conversion material. Alternatively, the configuration may be such that a light-guiding plate having a light source on a side thereof is arranged under a reflective film, as shown in FIG. 2. The following description is based on these configurations.

<Light Source>

As a light source that is a component of the light source unit according to the present invention, any kind of light source can be used as long as it exhibits light emission in a wavelength region that can be absorbed by a light emitting substance contained in the below-mentioned color conversion material. For example, any light source such as a hot-cathode tube, cold-cathode tube, fluorescent light source such as inorganic EL, organic electroluminescent element light source, LED, incandescent light source, or sunlight is usable in principle, and LED in particular is a preferred light source. For example, in display and lighting applications, light sources receive blue light and emit green light, or receive ultraviolet light and emit blue light. In the former case, a blue LED having a light source in the range from 400 to 500 nm is a further preferred light source from the viewpoint that such an LED can enhance the color purity of blue light. In the latter case, a near ultraviolet ray LED having a light source in the range from 380 to 420 nm is a further preferred light source from the viewpoint of enhancing blue light emission efficiency and suppressing the deterioration of the internal materials by ultraviolet rays.

The light source may be one having one light emission peak or one having two or more of light emission peaks, and one having one light emission peak is preferred for enhancing the color purity. In addition, it is possible to use any combination of a plurality of light sources having different kinds of light emission peaks.

<Color Conversion Material>

The light source unit according to the present invention needs to be configured to include a color conversion material that converts incident light from the light source into light having a longer wavelength than the incident light, wherein the incident light is, in other words, light incident from the light source on the color conversion material. Here, converting incident light from the light source into light having a longer wavelength than the incident light is defined as follows. First, an emission spectrum of the light source is measured, the wavelength showing the largest intensity in the light emission spectrum is regarded as the light emission peak wavelength of the light source, and the light emission bandwidth showing an intensity of 50% or more of the light emission intensity at the light emission peak wavelength of the light source is regarded as the light emission bandwidth of the light source. Subsequently, the light emission spectrum of light received from the light source via the color conversion material is measured. The thus obtained wavelength that shows the largest intensity and is other than the light emission peak wavelength of the light source is regarded as the peak wavelength of the light from the color conversion material, and the band showing an intensity of 50% or more of the intensity of the light from the color conversion material at the peak wavelength of the light from the color conversion material is regarded as the bandwidth of the light from the color conversion material. Having this bandwidth of the light from the color conversion material on the longer wavelength side of the light emission bandwidth of the light source is defined as converting the incident light from the light source into light having a longer wavelength than the incident light, and more specifically, this means that the long wavelength end of the bandwidth of the light from the color conversion material is on the longer wavelength side of the long wavelength end of the light emission bandwidth of the light source. Using such a color conversion material makes it easy to emit light of a red, green, and blue color individually and makes it possible to obtain a light source unit and a liquid crystal display that have a lot of kinds of expressible colors and high color reproducibility. In a case where there are a plurality of local peaks of the light from the color conversion material, part of the bandwidth of the light from the color conversion material may have an intensity of less than 50% of the largest intensity, but in this case, the wavelength at the end of the color conversion material's bandwidth having the longest wavelength in the split bandwidths of the light from the color conversion material has only to be on the longer wavelength side of the long wavelength end of the light emission bandwidth of the light source. In addition, a combination of a light source and a color conversion material that is used in the present application is more preferably such that the short wavelength end of the bandwidth of the light from the color conversion material is on the longer wavelength side of the long wavelength end of the light emission wavelength of the light source (the smallest wavelength in a band viewed on a wavelength basis is referred to as the short wavelength end, and the largest wavelength in the same band is referred to as the long wavelength end). In this case, the color conversion material emits light of colors different from the colors of the light source, and accordingly, a display having better color reproducibility can be obtained.

The color conversion material that is a component of the light source unit according to the present invention is a member that converts light having a specific wavelength into light having another wavelength, as above-mentioned, and an example of the member is a film or sheet containing a color conversion substance such as a quantum dots or fluorescent substance having a function by which light wavelengths are converted. The color conversion material may be a resin film containing a color conversion substance or may be a laminate composed of a base film and a film that contains a color conversion substance and layered on the base film. Another example is use of a color conversion material as a substitute for a color filter composed of usual three colors: red, green, and blue. In the case of use of a blue color light source, a color conversion material for a red color, a color conversion material for a green color, and a transparent member that transmits a blue color are used as substitutes for color filters for red, green, and blue respectively.

Examples of quantum dots include CdSe having a ZnS shell. Alternatively, a core/shell light emission nanocrystal containing CdSe/ZnS, InP/ZnS, PbSe/PbS, CdSe/CdS, CdTe/CdS, or CdTe/ZnS may be used.

A known inorganic fluorescent substance can be used as long as it can finally reproduce a predetermined color, and is not limited to a particular one. Examples include YAG fluorescent substances, TAG fluorescent substances, silicate fluorescent substances, nitride fluorescent substances, oxynitride fluorescent substances, nitrides, oxynitride fluorescent substances, β-sialon fluorescent substances, and the like. Among them, YAG fluorescent substances and β-sialon fluorescent substances are preferably used.

Examples of YAG fluorescent substances include yttrium/aluminum oxide fluorescent substances activated with at least cerium, yttrium/gadolinium/aluminum oxide fluorescent substances activated with at least cerium, yttrium/aluminum/garnet oxide fluorescent substances activated with at least cerium, and yttrium/gallium/aluminum oxide fluorescent substances activated with at least cerium, and specific examples include $Ln_3M_5O_{12}$:R (wherein Ln is at least one or more selected from Y, Gd, La; M includes at least one of Al and Ca; and R is a lanthanoid) and $(Y_{1-x}Ga_x)_3(Al_{1-y}Ga_y)_5O_{12}$:R (R is at least one or more selected from Ce, Tb, Pr, Sm, Eu, Dy, and Ho; $0<x<0.5$; and $0<y<0.5$).

β-sialons is a solid solution of β-silicon nitride, which is a solid solution resulting from the same crystal as a β-silicon nitride crystal except that Si is substituted with Al and that N is substituted with O. The unit cell (unit lattice) has atoms of two formular weights and accordingly, $Si_{6-z}Al_zO_zN_{8-z}$ is used as the general formula. Here, the composition z is 0 to 4.2 and has a very wide solid solution extent, and the molar ratio of (Si, Al)/(N, O) needs to maintain ¾. A general method of producing β-sialon is one in which silicon oxide and aluminum nitride are added, or aluminum oxide and aluminum nitride are added, to silicon nitride, followed by heating the resulting mixture.

β-sialon into the crystal structure of which a light emission element (Eu, Sr, Mn, Ce or the like) such as a rare earth has been taken becomes a β-sialon fluorescent substance that is excited by light from ultraviolet to blue and exhibits green light emission of 520 to 550 nm. This is preferably used as a green light emission component of a light emission device such as a white LED. In particular, a $Eu^{2+}$ activated β-sialon fluorescent substance containing europium ($Eu^{2+}$) has a very sharp light emission spectrum, and accordingly, is a raw material suitable for a backlight source of an image processing display device or liquid crystal display panel that requires a narrow band light emission of blue, green, and red.

Examples of organic fluorescent substances include: compounds having a condensed aryl ring, such as naphthalene, anthracene, phenanthrene, pyrene, chrysene, naphthacene, triphenylene, perylene, fluoranthene, fluorene, and indene, and derivatives of the compounds;

compounds having a heteroaryl ring, such as furan, pyrrole, thiophene, silol, 9-silafluorene, 9,9'-spirobisilafluorene, benzothiophene, benzofuran, indole, dibenzothiophene, dibenzofuran, imidazopyridine, phenanthroline, pyridine, pyrazine, naphthyridin, quinoxaline, and pyrrolopyridine, and derivatives of the compounds;

borane derivatives;

stilbene derivatives such as 1,4-distyrylbenzene, 4,4'-bis (2-(4-diphenylaminophenyl)ethenyl)biphenyl, 4,4'-bis(N-(stilbene-4-yl)-N-phenylamino)stilbene;

aromatic acetylene derivatives, tetraphenyl butadiene derivatives, aldazine derivatives, pyrromethene derivatives, diketopyrrolo[3,4-c]pyrrole derivatives;

coumarin derivatives such as coumarin 6, coumarin 7, and coumarin 153;

azole derivatives such as imidazole, thiazole, thiadiazole, carbazole, oxazole, and oxadiazole, triazole, and metal complexes of the derivatives;

cyanine compounds such as indocyanine green;

xanthene compounds and thioxanthene compounds, such as fluorescein/eosin/rhodamine;

polyphenylene compounds, naphthalimide derivatives, phthalocyanine derivatives and metal complexes thereof, and porphyrin derivatives and metal complexes thereof;

oxazine compounds such as Nile red and Nile blue;

helicene compounds;

aromatic amine derivatives such as N,N'-diphenyl-N,N'-di(3-methylphenyl)-4,4'-diphenyl-1,1'-diamine; and organic metal complex compounds such as iridium (Ir), ruthenium (Ru), rhodium (Rh), palladium (Pd), platinum (Pt), osmium (Os), and rhenium (Re).

At least one kind of color conversion substance has only to be contained in the color conversion material, and two or more kinds of color conversion substances may be contained in the member.

Here, the color conversion material is a tangible substance a component of which is a substance having the color conversion function, and examples of such members include: a film-shaped member into which a material having the color conversion function is formed alone or in which the material is laminated on another material; and a member wherein a material having the color conversion function is fixed by printing/coating on a hard member typified by glass. In this regard, the film has a two-dimensional expanse, but the meaning of the film does not rely on the magnitude of the expanse. For example, even a member having a thickness (in the z axis direction) of 10 nm and an xy-plane area of 1 μm² can be referred to as a film.

<Reflective Film>

The reflective film that is a component of the light source unit according to the present invention exists between the light source and the color conversion material and that transmits light from the light source incident perpendicularly on the film surface and reflects light from the color conversion material incident perpendicularly on the film surface; wherein the P-Polarized light of the light incident from the light source on the reflective film surface at an angle of 20°, 40°, and 60° is reflected at a reflectance of R20(%), R40(%), and R60(%) respectively, which need to satisfy R20<R40<R60 (hereinafter, such a film may be referred to as a first reflective film).

Here, transmitting light from the light source incident perpendicularly on the film surface means that the average transmittance is 70% or more in the above-mentioned light emission bandwidth of the light source in the transmission spectrum of the reflective film at an incident angle of 00. Light emission at the color conversion material can be easily enhanced by allowing the reflective film to transmit light incident from the light source and thereby increasing the amount of light in which the light incident from the light source reaches the color conversion material. The average transmittance of light from the light source incident on the reflective film at an incident angle of 0° in the light emission bandwidth of the light source is preferably 80% or more, more preferably 85% or more, still more preferably 90% or more. Increasing the transmittance makes it easy to enhance the color conversion efficiency of the color conversion material more efficiently. Production of such a reflective film can be achieved not only by controlling the layer thickness of each layer of the film to thereby optimize the reflection bandwidth but also by providing a layer composed of a resin having a low refractive index to the surface to thereby suppress surface reflection.

The first reflective film needs to reflect light from the color conversion material incident perpendicularly on the film surface of the reflective film. As mentioned herein, reflecting light incident from the color conversion material means that the largest reflectance is 30% or more in the bandwidth of the light from the above-mentioned color conversion material in the reflection spectrum of the reflective film at an incident angle of 10°. One of the causes of a decrease in luminance in a light source unit produced using a color conversion material containing a color conversion substance is a loss in the amount of light caused by stray light generated by isotropical light emission from the color conversion material. In particular, stray light from the color conversion material toward the light source causes in the light source unit is the main cause of a loss in the amount of light, but, according to the present invention, a mechanism for reflecting light that is incident from the light source on the color conversion material and converted into light having a long wavelength is provided between the light source and the color conversion material, whereby light from the color conversion material can be reflected right under the color conversion material, and it becomes easier to suppress a decrease in luminance caused by stray light in the cavity on the light source side. Preferably, the largest reflectance is 30% or more in the light emission bandwidth of the above-mentioned light source in the reflection spectra of the reflective film at incident angles of 10° and 60°. Light going out of the color conversion material is isotropically emitted light, and accordingly, it is preferable to reflect light incident at a wide range of angles, and allowing light incident at incident angles of 10° and 60° to be reflected at a high reflectance is effective for enhancing the luminance further. Furthermore, the average reflectance is preferably 30% or more, more preferably 50% or more, still more preferably 90% or more, in the bandwidth of the light from the color conversion material in the reflection spectrum of the reflective film at an incident angle of 10°. As the average reflectance in the bandwidth of the light from the color conversion material is larger, the effect of allowing light going out of the color conversion material toward the light source to be converted to visible light is enhanced, whereby a light source unit having a higher luminance can be obtained.

Figure 3:
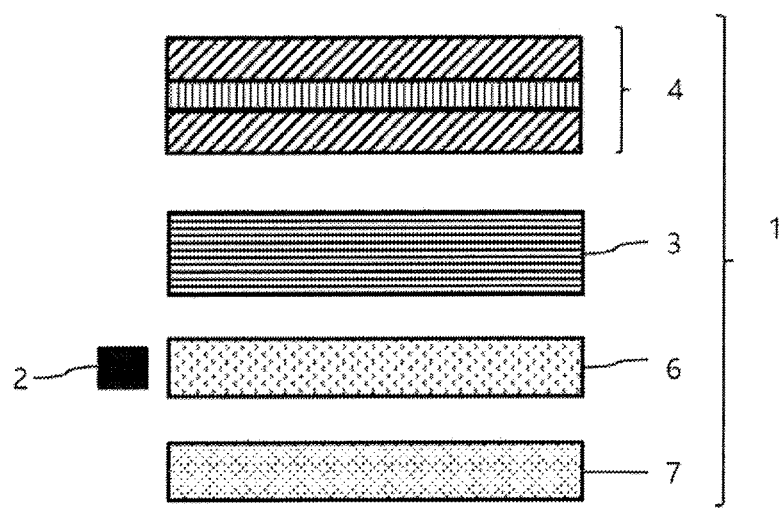
FIG. 3 is a schematic cross-sectional view showing an example of the light source unit according to the present invention.
Figure 4:
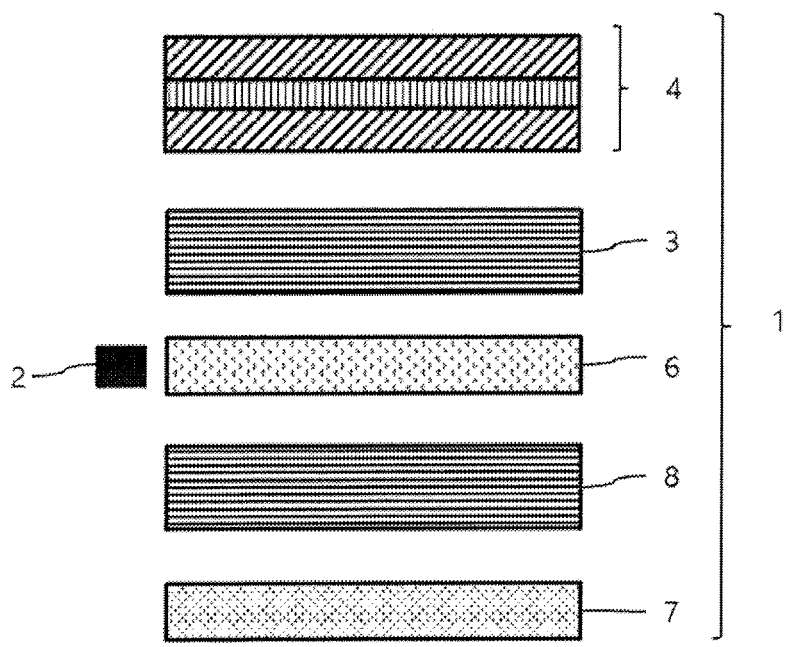
FIG. 4 is a schematic cross-sectional view showing an example of the light source unit according to the present invention.

With reference to the reflectance of the P-Polarized light of light from the light source, the first reflective film needs to be such that the P-Polarized light of the light incident on the reflective film surface at an angle of 20°, 40°, and 60° is reflected at a reflectance of R20(%), R40(%), and R60(%) respectively, which satisfy R20<R40<R60. The P-Polarized light as mentioned herein is light that oscillates in parallel to the plane of incidence which is perpendicular to the film surface and includes the light axis direction, and specifically, the P-Polarized light can be determined by measurement carried out using a spectrophotometer and a polarizer. When such a reflective film is used, the light incident in an oblique direction has a higher reflectance than the light incident in the frontal direction, and as a result, the ratio of the light traveling in the frontal direction is increased, enhancing the luminance in the frontal direction, and makes it possible to suppress leakage of light into sites where light from the light source is turned off, and accordingly makes it easy to increase the contrast between the black display portions and the white display portions. Conventional articles of alternately laminated inorganic materials are such that the P-polarized light once decreases with an increase in incident angle, and then reaches a reflectance of zero at Brewster's angle, whereafter the reflectance increases, and accordingly, R20<R40<R60 cannot be satisfied. On the other hand, a reflective film that satisfies R20<R40<R60 can be obtained by biaxially-stretching a multilayer laminate film made of a polymer and, in addition, controlling the reflection bandwidth such that, in frontal incidence, the reflection bandwidth is not included in the light emission bandwidth of the light source and, in oblique incidence, the reflection bandwidth partially overlaps the light emission bandwidth. The reflective film is preferably such that the short wavelength end of the reflection bandwidth of light incident at 60° on the film surface is on the lower wavelength side of the long wavelength end of the light emission bandwidth of the light source. As mentioned herein, the reflection bandwidth of a reflective film is a section between the short wavelength end and the long wavelength end, wherein the short wavelength end of the reflection bandwidth of the reflective film is the lowest wavelength of the wavelengths corresponding to Rmax/2(%) and is 400 nm or more, wherein the long wavelength end of the reflection bandwidth of the reflective film is the longest wavelength of the wavelengths corresponding to Rmax/2(%) or more and is 1600 nm or less, wherein Rmax (%) is the largest reflectance in the wavelengths from 400 to 1600 nm in a reflection spectrum determined by the below-mentioned measurement method at a predetermined incident angle on the reflective film. For example, a reflection bandwidth at 60° incidence on the film surface refers to a band between the short wavelength end and the long wavelength end in the wavelengths of 400 to 1600 nm in a reflection spectrum at an incident angle of 60°, and a reflection bandwidth at a 30° incidence on the film surface refers to a band between the low wavelength end and the long wavelength end in the wavelengths from 400 to 1600 nm in a reflection spectrum at an incident angle of 30°. Use of such a reflective film allows light from the light source incident at 60° on the reflective film surface to be reflected at a high reflectance efficiently and accordingly makes it easier to obtain the effects of enhancing luminance in a more frontal direction and enhancing the contrast of black display. Light incident on the film surface in an oblique direction is reflected at a high reflectance, and furthermore, the reflected light propagates further through a light-guiding plate, whereby out-going of light from the light source is made uniform in the light-guiding plate, bringing about an effect of affording a light source unit having less luminance ununiformity. Accordingly, a reflective film that satisfies the above-mentioned P-Polarized light reflectance is preferably used, as shown in FIGS. 2 to 4, for a light source unit further including a light-guiding plate that is on the opposite side of the reflective film from the color conversion material, wherein the light source is arranged on a side of the light-guiding plate. The reflective film is more preferably such that the short wavelength end of the reflection bandwidth of light incident at 30° on the film surface is on the lower wavelength side of the long wavelength end of the light emission bandwidth of the light source, and an effect of extracting light only in the frontal direction and an effect of suppressing the luminance ununiformity of the light source unit are more remarkable at a smaller angle at which the low wavelength end of the reflection bandwidth of the reflective film is on the lower wavelength side of the long wavelength end of the light emission bandwidth of the light source.

Figure 7:
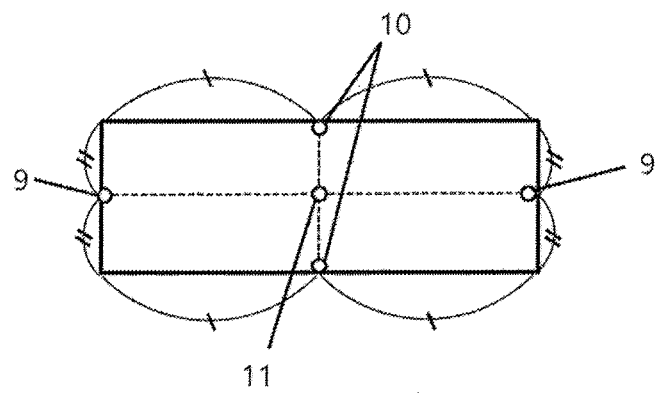
FIG. 7 is a schematic diagram showing the positions of the longitudinal direction ends, transverse direction ends, and center of a reflective film.

The first reflective film is preferably such that a difference between the largest value and the smallest value of the short wavelength ends of the reflection bandwidths at three points: the center and both ends of the reflective film in the longitudinal direction, or a difference between the largest value and the smallest value of the short wavelength ends of the reflection bandwidths at three points: the center and both ends of the reflective film in the transverse direction is 30 nm or less. As mentioned herein, both ends in the longitudinal direction refer to both ends in the longitudinal direction that are positioned at the midpoints of the shorter sides, as shown in FIG. 7, and both ends in the transverse direction refer to both ends in the transverse direction that are positioned at the midpoints of the longer sides, as shown in FIG. 7. The longitudinal direction of the reflective film is such that, in a case where the light source unit is generally quadrangular, the longer side direction of the quadrangle is the longitudinal direction, and the shorter side direction is the transverse direction. In a case where the light source unit is not in generally quadrangular shape, the direction in which a diagonal line can be drawn so as to pass through the centroid and be the longest is regarded as the longitudinal direction, and the direction perpendicular to the diagonal line is regarded as the transverse direction. In this case, both ends in the longitudinal direction refer to both ends in the longitudinal direction that are defined above, and both ends in the transverse direction refer to both ends in the transverse direction that are defined above. In a light source unit and a display produced using the unit, the shift of the position of the short wavelength end of the reflection bandwidth of the reflective film changes the incident angle at which the reflectance of light incident obliquely on the film surface increases, and accordingly the shift causes the in-plane luminance in the frontal direction to be changed. In view of this, the difference between the largest value and the smallest value of the short wavelength ends of the reflection bandwidths at three points: the center and both ends of the reflective film in the longitudinal direction, or the difference between the largest value and the smallest value of the short wavelength ends of the reflection bandwidths at three points: the center and both ends of the reflective film in the transverse direction is 30 nm or less, whereby the frontal direction luminance of the light source unit is made uniform, and furthermore, a light source unit or a display having no luminance ununiformity can be obtained. Preferably, the difference between the largest value and the smallest value of the short wavelength ends of the reflection bandwidths at three points: the center and both ends is 20 nm or less, and the smaller this difference is, the better the uniformity of the frontal direction luminance is. Examples of methods of obtaining such a reflective film include a method in which a transverse stretching ratio is increased when a reflective film is produced, and a method in which, in a case where the reflective film is composed of the below-mentioned laminate film, the thickness of the outermost surface layer is 3% or more of the thickness of the reflective film. Taking such a method makes it possible to enhance the uniformity of the reflection bandwidth in the width direction perpendicular to the flow direction in film production.

In addition, the difference between the largest value and the smallest value of the short wavelength ends of the reflection bandwidths at three points: the center and both ends of the first reflective film in the longitudinal direction and the difference between the largest value and the smallest value of the short wavelength ends of the reflection bandwidths at three points: the center and both ends in the transverse direction are both preferably 30 nm or less. Having the uniform short wavelength ends of the reflection bandwidths both in the longitudinal direction and in the transverse direction makes it possible that a light source unit and a display which are produced using the film have uniform luminance in the frontal direction and no ununiformity in the whole plane area.

In addition, a difference between the largest value and the smallest value of the average reflectances in the reflection bandwidths at three points: the center and both ends of the first reflective film in the longitudinal direction and a difference between the largest value and the smallest value of the average reflectances in the reflection bandwidths at three points: the center and both ends in the transverse direction are both preferably 10% or less. As mentioned herein, the average reflectance in the reflection bandwidth refers to the average reflectance in the reflection bandwidth determined as above-mentioned. Examples of factors that contribute to color shade and luminance include: not only the position of the above-mentioned short wavelength end of the reflection bandwidth of the reflective film; but also the ununiformity of reflectances in the reflection bandwidth. Here, as the average reflectance in the reflection bandwidth is more highly uniform, it is easier to allow a light source unit and a display produced using the unit to have no luminance ununiformity, in particular. The difference between the largest value and the smallest value of the average reflectances in the reflection bandwidths is preferably 5% or less, more preferably 3% or less. As the difference in the average reflectance is smaller, it is more likely that a light source unit having uniform luminance in the frontal direction and a display produced using the light source unit can be obtained. Examples of methods of obtaining such a reflective film include a method in which a transverse stretching ratio is increased when a reflective film is produced, and a method in which, in a case where the reflective film is composed of the below-mentioned laminate film, the thickness of the outermost surface layer is 3% or more of the thickness of the reflective film. Taking such a method makes it possible to enhance the uniformity of the reflection bandwidth in the width direction perpendicular to the flow direction in film production. In addition, it is possible to suppress variation in reflectance also by enhancing the average reflectance in the reflection bandwidth.

In addition, it is also preferable that the smallest value of the correlation coefficients between the reflectances in the wavelengths from 400 to 800 nm at the center of the first reflective film and the reflectances in the wavelengths from 400 to 800 nm at four points: both ends in the longitudinal direction and both ends in the transverse direction is 0.8 or more. As mentioned herein, correlation coefficients refer to correlation coefficients between values obtained by measuring reflectances at 1 nm intervals in the wavelengths of 400 nm to 800 nm at the center of the film and values obtained by measuring reflectances at 1 nm intervals in the wavelengths from 400 nm to 800 nm at both ends of the film. A higher correlation coefficient value means that the distributions of reflectances is closer, and the value is 1 when the distributions of reflectances are exactly the same. That the smallest value of the correlation coefficients is 0.8 or more means that the smallest correlation coefficient of four correlation coefficients obtained from the reflectances in the wavelengths from 400 nm to 800 nm at the center of the film and the reflectances in the wavelengths from 400 nm to 800 nm at four points: both ends in the longitudinal direction and both ends in the transverse direction is 0.8 or more. In the above description, uniformization of luminance in the frontal direction has been explained on the basis of the short wavelength end and average reflectance in the reflection bandwidth of the reflective film, and the correlation coefficient is an index that includes both factors and refers to the uniformity of a reflection waveform, and accordingly, a correlation coefficient of 0.8 or more affords a reflective film having excellent luminance and uniformity in the frontal direction, and enables a light source unit and a display that are produced using the film to have no luminance ununiformity. The correlation coefficient is preferably 0.9 or more, more preferably 0.95 or more. A correlation coefficient of 0.95 or more makes it possible that the luminance ununiformity is hardly recognizable in a light source unit and a display in which the reflective film is mounted. Examples of methods of obtaining such a reflective film include a method in which a transverse stretching ratio is increased when a reflective film is produced, and a method in which, in a case where the reflective film is composed of the below-mentioned laminate film, the thickness of the outermost surface layer is 3% or more of the thickness of the reflective film. In particular, allowing the thickness of the outermost surface layer to be 5% or more of the thickness of the reflective film enables the correlation coefficient to be 0.95 or more.

The first reflective film is preferably such that the short wavelength end of the reflective film is larger than the light emission wavelengths of the light source and smaller than the wavelengths of the light from the color conversion material. Here, that the short wavelength end of the reflective film is larger than the light emission wavelengths of the light source means that the short wavelength end of the reflection bandwidth of the reflective film is on the longer wavelength side of the long wavelength end of the light emission bandwidth of the light source. In addition, that the short wavelength end of the reflective film is smaller than the wavelengths of the light from the color conversion material means that the short wavelength end of the reflection bandwidth of the reflective film is on the lower wavelength side of the short wavelength end of the bandwidth of the light from the color conversion material. For example, when a display including a light source unit, such as a mobile display, is watched from the front, the luminance is important depending on the design of the light source unit and on how to use the display, and in this case, if the short wavelength end of the reflective film is larger the light emission wavelengths of the light source and smaller than the wavelengths of the light from the color conversion material, it is easy to allow light going out of the color conversion material to be efficiently reflected on the reflective film in the frontal direction, affording an excellent frontal luminance enhancement effect.

The first reflective film preferably satisfies the following equation (1). The following equation (1) indicates that a change in reflectance is steep between the light reflecting wavelength band and the light transmitting wavelength band, and, the smaller $|\lambda 1-\lambda 2|$ is, the more steeply the reflectance changes from the reflecting wavelength band toward the transmitting wavelength band. Thus, allowing a change in reflectance to be made steeply from the reflecting wavelength band toward the transmitting wavelength band, in other words, from the light emission bandwidth of the light source toward the bandwidth of the light from the color conversion material, makes it possible to selectively and efficiently transmit only light from the light source and to efficiently reflect light going out of the color conversion material, and makes it the easiest possible to obtain the effects of the reflective film. More preferably, $|\lambda 1-\lambda 2|$ is 30 nm or less. The smaller $|\lambda 1-\lambda 2|$ is, the better the luminance enhancement effect and luminance uniformity are.

$$|\lambda 1-\lambda 2| \leq 50 (\text{wherein}, \lambda 1 < \lambda 2) \quad (1)$$

$\lambda 1$: wavelength (nm) at which the reflectance is ¼ of the largest reflectance at or near the short wavelength end of the reflection bandwidth of the reflective film $\lambda 2$: wavelength (nm) at which the reflectance is ¾ of the largest reflectance at or near the short wavelength end of the reflection bandwidth of the reflective film As shown in FIG. 2, it is also preferable that the light source unit according to the present invention further includes a light-guiding plate on the opposite side of the first reflective film from the color conversion material, wherein the light source is arranged on a side of the light-guiding plate. A light source unit in which a light source, a reflective film, and a color conversion material are arranged in line makes it possible to sufficiently obtain an effect of enhancing luminance in the frontal direction and an effect of enhancing the contrast between the black display portions and the white display portions, but satisfying the configuration in which a light-guiding plate is further provided on the opposite side of the reflective film from the color conversion material, wherein the light source is arranged on a side of the light-guiding plate, is more preferable also because the luminance uniformization effect is expressed in the light-guiding plate as above-mentioned.

As shown in FIG. 3, the light source unit according to the present invention can include another reflective film (such a film is also referred to as a second reflective film) on the opposite side of the light-guiding plate from the side on which a reflective film (a first reflective film) exists, and the second reflective film preferably contains voids. The second reflective film containing voids can reflect and scatter light incident on the film surface. Accordingly, light that is incident obliquely on the first reflective film and reflected by the film is further reflected and scattered by the second reflective film, whereby part of the light reflected by the first reflective film is enabled to turn into light traveling in the frontal (perpendicular) direction to the first reflective film. This results in enhancing the efficiency of light extraction in the frontal direction, and eventually, in making it easy to enhance the luminance in the frontal direction. In a case where the second reflective film, which has no scattering action, is used, light incident obliquely on the first reflective film results in mirror reflection at the same angle as an angle at which the light is incident on the second reflective film, and accordingly, is reflected again on the first reflective film, and the light extraction efficiency tends to decrease.

As shown in FIG. 4, it is preferable that the light source unit according to the present invention further includes another reflective film (such a film is also referred to as a third reflective film) between the second reflective film and the light-guiding plate, wherein the third reflective film reflects light from the light source incident perpendicularly on the film surface and transmits light from the light source incident on the film surface at an angle of 60°. In a case where the second reflective film is used, the out-going angle of light is adjusted by the light-guiding plate and the like, and light traveling in the direction perpendicular to the surface of the first reflective film is virtually scattered again on the second reflective film, but including the third reflective film between the light-guiding plate and the second reflective film, wherein the third reflective film reflects light from the light source incident perpendicularly on the film surface and transmits light from the light source incident on the film surface at an angle of 60°, makes it possible that light incident from the light-guiding plate perpendicularly on the surface of the third reflective film is reflected on the third reflective film, and that light incident from the light-guiding plate obliquely on the surface of the third reflection film is transmitted by the third reflective film and reflected such that the direction in which the light travels is changed at the second reflective film. As a result, it is possible to efficiently enhance the amount of light that is incident perpendicularly on the first reflective film, and accordingly, it is made easier to enhance the luminance in the frontal direction and to enhance the contrast between the black display portions and the white display portions.

The reflective film that is a component of the light source unit according to the present invention is preferably composed of a thermoplastic resin. Thermoplastic resins are generally more inexpensive than thermosetting resins and photo-curing resins, can be formed into sheets easily and continuously with known melt-extruders, and accordingly make it possible to obtain reflective films at low cost.

The first reflective film is preferably composed of alternately laminated 11 or more layers of a plurality of different thermoplastic resins. As mentioned herein, different thermoplastic resins refer to ones having a difference of 0.01 or more in refractive index in any direction from among any selected two directions perpendicular to each other in the plane of the reflective film and a direction perpendicular to the plane. As mentioned herein, alternately laminated layers refer to layers of different thermoplastic resins laminated in regular order in the thickness direction, and, assuming that layers of thermoplastic resins, A and B, are designated as the A layer and the B layer respectively, the laminated layers are a laminate expressed as A(BA)n (n is a natural number). Allowing resins having different optical properties to be alternately laminated in such a manner makes it possible to achieve interference reflection that can bring about reflection of light having a wavelength designed on the basis of the relationship between interlayer differences in refractive index and layer thickness. A laminate of 10 or less layers does not afford a high reflectance in a desired band. In addition, the above-mentioned interference reflection is such that a larger number of layers make it possible to achieve a high reflectance of light having a wider wavelength band and to obtain a reflective film that reflects light having a desired band. The number of layers is preferably 100 or more, more preferably 200 or more. It is still more preferably 600 or more. Although the number of layers has no upper limit, a larger number of layers require larger production equipment accompanied by an increase in production cost, the larger thickness of the film impairs handling properties, and accordingly, the layer number of about 10000 is in a practical range, in reality.

For the light source unit according to the present invention, it is also preferable to use, for a laminate member, a color conversion material that converts incident light from the light source into light having a longer wavelength than the incident light and a reflective film that transmits incident light from the light source and that reflects light from the color conversion material. Here, a laminate member including a color conversion material and a reflective film implies that the color conversion material and the reflective film are fixed to each other directly or via an adhesive layer and the like. This results in having no gap between the color conversion material and the reflective film, accordingly suppresses a loss in light caused by stray light, and causes no reflection between the surface of the color conversion material and air, whereby the luminance enhancement effect is made remarkable.

In a more preferable embodiment, a layer composed of the color conversion substance is directly disposed on the reflective film, and the reflective film is made part of the color conversion material. This embodiment makes it possible to replace a base material used in forming the color conversion material, reduce cost, and in addition, further eliminate a gap between the color conversion substance and the reflective film in the color conversion material, whereby the effect of suppressing a loss in light caused by stray light is made remarkable.

Similarly, the second reflective film and/or the third reflective film are/is also preferably fixed to the light-guiding plate directly or via an adhesive layer and the like. This also makes it possible to eliminate a gap between the light-guiding plate and the second reflective film and/or the third reflective film, accordingly suppress a loss in light caused by stray light, eliminate reflection between the light-guiding plate and air and between the reflective film surface and air, and thereby reflect light efficiently.

Figure 5:
FIG. 5 is a schematic cross-sectional view showing an example of the concavo-convex shape of the surface of a reflective film.
Figure 6:
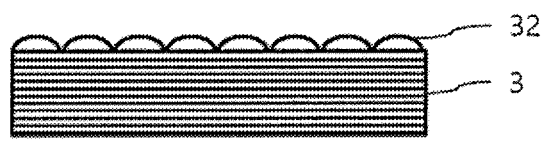
FIG. 6 is a schematic cross-sectional view showing an example of the concavo-convex shape of the surface of a reflective film.

The surface of the reflective film or color conversion material that is a component of the light source unit according to the present invention preferably has a concavo-convex shape. As mentioned herein, a concavo-convex shape refers to the shape of the film surface or interface, wherein the measured largest height of the shape is 1 μm or more. An example of such a concavo-convex shape is shown in FIGS. 5 and 6. In addition, the effects brought about by having a concavo-convex shape on the surface of the reflective film or the color conversion material are described below.

A first effect is easily-slippery properties. Having a concavo-convex shape allows the surface to express easily-slippery properties, and accordingly, can suppress generation of blemishes when the reflective film and the color conversion material are incorporated into the light source unit.

A second effect is extraction of light. The present inventors have discovered a phenomenon such that a color conversion material including a color conversion substance causes light to be reflected in the color conversion material and thus causes a phenomenon in which the light is trapped in the sheet as in an optical fiber, with the result that the color conversion substance itself has light emission efficiency but has lower luminance. Then, the present inventors have discovered that, as a solution to that, providing a concavo-convex shape on the surface of the reflective film or the color conversion material allows light to be extracted through the concavo-convex interface, thus reduces light taken into the color conversion material, and accordingly makes it possible to obtain a luminance enhancement effect. To obtain the second effect efficiently, the largest height is preferably 1 μm or more, more preferably 5 μm or more, still more preferably 10 μm or more. The larger the concavo-convex shape is, the more the light extraction efficiency is enhanced, and the more the effect of suppressing the ununiformity in the light source is obtained. To obtain this effect more efficiently, it is preferable that a layer composed of a color conversion substance is directly provided on the reflective film so that the reflective film can be part of the color conversion material and that the layer side surface of the color reflective film, wherein the layer is composed of the color conversion substance; has a concavo-convex shape. In this case, it is possible to not only extract light efficiently but also reflect light toward the display side efficiently, and accordingly, the luminance enhancement effect is made remarkable.

A third effect is adjustment of the path of light. From a light source, a light emitting diode in particular, light travels relatively more directionally toward the display side, but light from the color conversion material is emitted isotropically and accordingly causes the luminance in the light source front to decrease. Having a concavo-convex shape on the surface of the reflective film or the color conversion material makes it easy to achieve luminance enhancement by adjusting the direction of light at the concavo-convex interface and collecting light in the frontal direction in particular, and in addition, makes it possible to even omit other optical members in forming a light source unit and a display, and accordingly, contributes also to cost reduction.

To obtain the second effect and the third effect more efficiently, it is preferable that the concavo-convex shape is a lens shape, a generally triangle shape, or a generally semicircular shape. A microlens shape refers to a generally hemispherical concavo-convex shape, and a prism shape refers to a generally triangle concavo-convex shape. Providing such a shape allows the path of light to be collected toward the display portion, and accordingly, a light source unit and a display that are thus formed result in achieving more remarkably enhanced frontal luminance.

Figure 8:
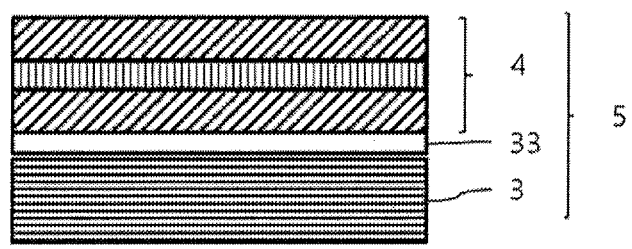
FIG. 8 is a schematic cross-sectional view showing an example of a laminate member in which a reflective film and a color conversion material are integrally combined.

As shown in FIG. 8, the light source unit according to the present invention has a functional layer on the surface of the reflective film or color conversion material that is a component of the light source unit, and it is preferable that the functional layer has a refractive index n3 which is between n1 and n2, wherein n1 is the refractive index of the reflective film, n2 is the refractive index of the color conversion material, and n3 is the refractive index of the functional layer. As mentioned herein, the refractive index of the reflective film and that of the color conversion material refer to the in-plane average refractive index of the outermost surface layer of each film. In this case, the effect of the refractive index of the functional layer allows reflection to be suppressed between the reflective film and the color conversion material which conventionally have different refractive indices, allows light from the light source to be transmitted efficiently, and accordingly makes it easy to enhance luminance.

The first reflective film used in the light source unit according to the present invention, and the second and third reflective films, if any, each preferably absorb or reflect ultraviolet rays. As mentioned herein, absorbing or reflecting ultraviolet rays refers to having, in the wavelengths from 300 nm to 410 nm, a band of 30 nm or more in which the transmittance is at least 50% or less. As with the light source unit and liquid crystal display according to the present invention, a light source used with a color conversion material is a light source having a lower wavelength than a usual white light source such as a blue LED and a near-ultraviolet LED and having high energy. Because of this, there is also a problem in that the light source used with a color conversion material emits a lot of ultraviolet rays, that are responsible for deterioration of the color conversion material and other optical films, and is more likely to cause a change in color and luminance during long-term use. In this respect, a configuration such that ultraviolet rays are absorbed or reflected by a reflective film disposed on the light source side of a color conversion material or another optical film such as a prism film makes it possible to suppress deterioration of the color conversion material and other optical films and to obtain a light source unit and a liquid crystal display that are suitable for long-term use. Preferably, the largest transmittance at a wavelength of 380 nm or less is 10% or less. In this case, such a configuration makes it possible to cut off most of ultraviolet rays, which are absorbed by the color conversion material and other optical films and thus cause them to deteriorate, and accordingly, such a configuration causes no change in color nor luminance, and is preferred in use of a color conversion material that emits red, green, and blue colors by means of a near-ultraviolet LED. More preferably, the largest transmittance at a wavelength of 410 nm or less is 10% or less. In the case of a color conversion material that emits red and green colors by means of a blue light, the absorbance that does not contribute much to color conversion efficiency but is responsible for the deterioration is caused also at 410 nm, but having the largest transmittance of 10% or less at a wavelength of 410 nm or less makes it easy to suppress such deterioration of the color conversion material. It is also preferable that the light transmittance is 10% or less at a wavelength 20 nm lower than the short wavelength end of the light emission bandwidth of the light source. As above-mentioned, the color of the light source is important for color conversion, but on the other hand, deteriorates the color conversion material itself. In view of this, the color conversion material is protected using a laminate film that transmits light having a wavelength actually important for color conversion but cuts off light having a low wavelength which hardly contributes to color conversion, and this protection makes it possible to substantially suppress the deterioration during long-term use without impairing the light emission efficiency of the color conversion material. Like this, a film that absorbs or reflects ultraviolet rays having a wavelength of 380 nm or more and that is used with an LED which emits red, green, and blue colors, such as a conventional white LED, tinges the display of white with yellow and causes a reduction in luminance, and accordingly, such a film is difficult to use although the film is effective for making the life of an optical film longer. However, the light source unit according to the present invention allows the light to be converted into a white color on the visual recognition side of the reflective film using only light having specific wavelengths, and accordingly does not pose a problem such as the above-mentioned yellowish tinge or a reduction in luminance and has been found to be usable in a preferred manner.

A resin that is a component of the reflective film that is a component of the light source unit according to the present invention is not limited to a particular one, and, for example, is selected from the viewpoints illustrated in paragraphs [0016] to [0024] in WO2013/002130.

In addition, the reflective film that is a component of the light source unit according to the present invention is also preferably such that any one of the thermoplastic resins which are components of the reflective film contains an ultraviolet absorber. An ultraviolet absorber, as mentioned herein, refers to a component that is other than a thermoplastic resin and that absorbs light having a wavelength of 300 to 410 nm, and the resin is regarded as containing an ultraviolet absorber when {100−average transmittance−average reflectance (absorptivity)} in the wavelengths from 300 to 410 nm is 10% or more. Containing an ultraviolet absorber makes it easy to cut off ultraviolet rays. It is more preferable that a laminate film is used as the reflective film and that the laminate film contains an ultraviolet absorber and has the largest reflectance of 20% or more in the wavelengths from 300 to 410 nm. The laminate film reflects, at the interface with an adjacent layer, light having a wavelength corresponding to the thickness of the layer, and when this occurs, the light is reflected in the film again and again, and then brought out of the film. Because of this, addition of an ultraviolet absorber to the laminate film increases the number of times of passage through a layer containing an ultraviolet absorber unlike a film having such a level as a few layers and causing no reflection in the film, and accordingly, makes it possible to obtain a high ultraviolet ray cut-off effect efficiently from a small amount of ultraviolet absorber and to cut off ultraviolet rays efficiently. When a film having one to ten layers is used, the film may precipitate an ultraviolet absorber in a long-term reliability test, but using a laminate film having 11 or more layers affords the advantage that allows an ultraviolet absorber to be trapped at interfaces between layers and in the layers and to be inhibited from precipitating on the film surface.

In addition, it is also preferable that the first reflective film has, on at least one side thereof, a layer composed of a curable resin and that the layer composed of a curable resin contains an ultraviolet absorber. In this case, allowing functions such as abrasion-resistance and dimensional stability to be added in accordance with the composition of the curable resin and in addition, having the high cross-linkability of the layer composed of the curable resin can suppress precipitation of an oligomer, additive, and the like that are contained in the reflective film. The reflective film may be directly coated with the layer composed of a curable resin. The layer composed of a curable resin may be provided on one side of the film, but, in general, an oligomer and the like precipitate on both sides of the film. When the layer composed of a curable resin is provided only on one side, strong contraction stress due to curing is applied to the layer side, the layer itself may remarkably curl in accordance with the thickness of the layer composed of a curable resin, and accordingly, the layer composed of a curable resin is preferably provided on both sides of the film. In addition, when the layer composed of a curable resin containing an ultraviolet absorber is provided on one side, the layer is preferably provided on the light source side. Providing the layer on the light source side can suppress deterioration of the reflective film itself.

The curable resin is not limited to a particular one, and is preferably one having high transparency and durability. For example, acrylic resins, urethane resins, fluorine-based resins, silicon resins, polycarbonate-based resins, and vinyl chloride-based resins can be used singly or in mixture. In the light of curability, flexibility, and productivity, the curable resin is preferably composed of an activated energy ray type curable resin such as an acrylic resin typified by a polyacrylate resin.

Two ultraviolet absorbers that will be defined are: general-purpose ultraviolet absorbers that absorb ultraviolet rays in a general wavelength region of 380 nm or less; and visible light absorbing dyes that can cut off even light having a wavelength at or near the boundary (380 to 430 nm) between the ultraviolet region and the visible region. General-purpose ultraviolet absorbers are generally specialized in the capability to absorb ultraviolet rays in a wavelength region of 380 nm or less, and does not have an excellent capability of absorbing rays at or near the boundary (at or near 380 to 430 nm) between the ultraviolet region and the visible region. Because of this, in a case where it is desired that light at or near the boundary (at or near 380 to 430 nm) between the ultraviolet region and the visible region is cut off only on the basis of allowing the resin to contain a general-purpose ultraviolet absorber, it is necessary to allow the resin to contain the absorber at a high concentration, except for the below-mentioned some long-wavelength ultraviolet absorbers. Examples of ultraviolet absorbers that, as general-purpose ultraviolet absorbers, can singly cut off wavelengths in the ultraviolet region and at or near the boundary (380 to 430 nm) between the ultraviolet region and the visible region include commercially available ultraviolet absorbers such as compounds represented by the structure of 2-(5-chloro-2H-benzotriazole-2-yl)-6-tert-butyl-4-methyl-phenol or 2,4,6-tris(2-hydroxy-4-hexyloxy-3-methylphenyl)-1,3,5-triazine, although the examples are only illustrative. In addition, general-purpose ultraviolet absorbers are preferably ones having the maximum absorption wavelength between 320 and 380 nm. In a case where the maximum wavelength is smaller than 320 nm, it is difficult to cut off an ultraviolet region on the longer wavelength side sufficiently, and, even if a dye having the maximum wavelength which is the largest in the visible short wavelength region of more than 380 nm and 430 nm or less is used in combination, a region showing a light transmittance of 10% or more in the wavelength region of 300 to 380 nm occurs often.

On the other hand, visible light absorbing dyes generally have an excellent capability to cut off light in the visible short wavelength region, but have a poor capability to cut off light in the ultraviolet region of 380 nm or less. Because of this, in a case where it is desired that light in a general-purpose ultraviolet region is cut off only on the basis of allowing the resin to contain a visible light absorbing dye, the resin needs to contain the dye at a high concentration, except for the below-mentioned some visible light absorbing dyes. In addition, many visible light absorbing dyes generally have properties that allow a widely ranging wavelength region to be cut off broadly, and such dyes contained at a high concentration absorb a visible region of wavelengths even longer than a wavelength region of interest, thus posing a problem in that excellent transparency cannot be achieved. In addition, there are not so many kinds of visible light absorbing dyes having properties that allow the region at or near the boundary between the ultraviolet region and the visible region, particularly in the wavelength region of 380 nm to 440 nm, to be cut off in a narrow band, and it is desired that visible light absorbing dyes having a specific structure are selectively used. Examples of visible light absorbing dyes that, when singly added, can cut off wavelengths in the ultraviolet region and at or near the boundary (between 380 and 430 nm) between the ultraviolet region and the visible region include "Lumogen Fviolet 570" made by BASF, and the like. General-purpose ultraviolet absorbers and/or visible light absorbing dyes have their own regions in which they are better than others, and accordingly, a more preferable approach is effective combination of one or more kinds of ultraviolet absorbers and one or more kinds of visible light absorbing dyes when it is necessary to prevent bleedout due to high concentration addition and process contamination associated with the bleedout.

At least one of the general-purpose ultraviolet absorbers used in the present invention is preferably an ultraviolet absorber having a triazine skeleton structure. A triazine skeleton structure is known to have a pyrolysis temperature higher than a benzotriazole skeleton structure and a benzophenone skeleton structure that are generally used for other ultraviolet absorbers and to have an excellent long-term stability, and accordingly, is preferred for laminate films and ultraviolet-blocking films in display applications that require long-term retention of performance. In addition, a triazine skeleton structure has a low melting point, and accordingly, not only suppresses the surface precipitation of an ultraviolet absorber itself as a solid component but also achieves an effect of making it difficult to precipitate an oligomer and other ultraviolet absorbers having high sublimation properties, and accordingly can be preferably used.

A visible light absorbing dye used in the present invention more preferably has the maximum wavelength between 390 nm and 410 nm. Selecting a visible light absorbing dye having the maximum wavelength in the region of wavelengths longer than 410 nm may cause the average transmittance to be less than 80% in the light emission bandwidth of the light source if a dye having blocking performance in a very narrow band is not selected. Examples of preferably usable visible light absorbing dyes that have the maximum wavelength in the region of wavelengths between 390 nm and 410 nm and can achieve the absorption performance in a band include ones having any skeleton from among anthraquinone, azomethine, indole, triazine, naphthalimide, phthalocyanine, and triazine.

<Method of Producing Reflective Film>

Next, a preferable method of producing the first reflective film will be described below, taking, as an example, a reflective film composed of thermoplastic resins A and B. Obviously, the present invention is not to be construed to be limited to such an example. The laminate structure of this reflective film can conveniently be achieved using the same method as described in paragraphs [0053] to [0063] in JP 2007-307893 A.

A thermoplastic resin is provided in the form of pellets or the like. The pellets are dried in hot air or in vacuo, as necessary, and then fed into separate extruders. If the reflective film needs to contain an ultraviolet absorber, pellets of the thermoplastic resin into which an ultraviolet absorber is preliminarily kneaded are provided, or the thermoplastic resin and an ultraviolet absorber are kneaded in an extruder. In the extruder, the resin is melted by heating to the melting point or a higher temperature, the extrusion amount of the resin is uniformized with a gear pump or the like, and the resin gets rid of foreign matter, altered resin, and the like via a filter or the like. The resulting resin is molded into a shape of interest using a die, and then discharged. Then, the multilayered sheet discharged out of the die is pushed onto a cooling body such as a casting drum and solidified by cooling to obtain a cast film. When this is carried out, it is preferable that electrodes in wire shape, tape shape, needle shape, knife shape, or the like are used to allow the sheet to be electrostatically attached closely to the cooling body such as a casting drum, thereby solidifying the sheet by rapid cooling. Examples of other preferable methods include a method in which the sheet is attached closely to a cooling body such as a casting drum by air blown out of a device in slit shape, spot shape, plane shape, or the like and is thus rapidly cooled to be solidified, a method in which the sheet is attached closely to a cooling body using a nip roller and thus rapidly cooled to be solidified.

The plurality of resins, i.e. the thermoplastic resin used for the A layer and the thermoplastic resin B different therefrom, are delivered through different flow paths using two or more extruders and delivered into a multilayer laminating device. As a multilayer laminating device, a multi-manifold die, a feed block, a static mixer, and the like can be used, and particularly, in order to obtain the configuration according to the present invention efficiently, a feed block having 11 or more minute slits is preferably used. With such a feed block, the device does not have to be extremely large, accordingly does not produce much foreign matter due to thermal deterioration, and makes it possible to carry out high precision lamination even in a case where the number of layers to be laminated is extremely large. The lamination accuracy in the width direction is also dramatically enhanced, compared with conventional technologies. In addition, such a device makes it possible to adjust the thickness of each layer in slit shape (length and width) and accordingly to achieve any layer thickness.

The molten multilayer laminate thus formed into a desired layer configuration is introduced into a die to obtain a cast film in the same manner as above-mentioned.

The cast film thus obtained is preferably biaxially-stretched. As mentioned herein, biaxial-stretching refers to stretching in the longitudinal and width directions. Stretching may be carried out in the two directions sequentially or simultaneously. In addition, stretching may be carried out again in the longitudinal direction and/or the width direction.

First, a sequential biaxial-stretching process will be described. As mentioned herein, stretching in the longitudinal direction refers to stretching for providing the film with molecular orientation in the longitudinal direction, is usually provided by a circumferential velocity difference of the roller, and may be carried out in one step or carried out in multiple steps using a plurality of roller pairs. The stretching ratio varies depending on the kind of the resin, and is usually preferably 2 to 15 times, and a ratio of 2 to 7 times is particularly preferably used in a case where polyethylene terephthalate is used as any one of the resins that are components of the reflective film. In addition, the stretching temperature is preferably between the glass transition temperature of the resin that is a component of the reflective film and the glass transition temperature plus 100° C.

The uniaxially-stretched film thus obtained is allowed to undergo surface treatment such as corona treatment, flame treatment, and plasma treatment, if necessary, and then may be provided with a function such as easily-slippery properties, easily-adhesive properties, and anti-static properties by in-line coating. In particular, in forming a laminate member including a reflective film and a color conversion sheet, it is preferable to carry out in-line coating with a resin that has a refractive index lower than the refractive index of the thermoplastic resin A serving as the outermost surface layer of the reflective film and higher than that of the film serving as the outermost surface layer of the color conversion material.

Next, stretching in the width direction refers to stretching for providing a film with orientation in the width orientation, and a film is usually stretched in the width orientation using a tenter in which a film is conveyed with both ends of the film held with clips. The stretching ratio varies depending on the kind of the resin, and is usually preferably 2 to 15 times, and a ratio of 2 to 7 times is particularly preferably used in a case where polyethylene terephthalate is used as any one of the resins that are components of the reflective film. In particular, for the reflective film in the present invention, the width stretching ratio is preferably 4 times or more, and using an increased width stretching ratio is effective for enhancing the uniformity of the reflection bandwidth, the uniformity of the average reflectance, and the correlation coefficient. In addition, the stretching temperature is preferably between the glass transition temperature of the resin that is a component of the reflective film and the glass transition temperature plus +120° C.

The thus biaxially-stretched film is preferably heat-treated at a temperature between the stretching temperature and the melting point in the tenter in order to obtain flatness and dimensional stability. Heat-treating enhances the dimensional stability of a film for molding. The thus heat-treated film is slowly cooled uniformly, cooled to room temperature, and wound up. If necessary, relaxation treatment or the like may be applied together in steps from heat-treatment to slow cooling.

Next, a simultaneous biaxial-stretching process will be described. In a simultaneous biaxial-stretching process, the obtained cast film is allowed to undergo surface treatment such as corona treatment, flame treatment, and plasma treatment, if necessary, and then may be provided with a function such as easily-slippery properties, easily-adhesive properties, and anti-static properties by in-line coating.

Next, the cast film is introduced into a simultaneous biaxial tenter, in which the film is stretched in the longitudinal and width directions simultaneously and/or stepwisely while conveyed with both ends of the film held with clips. Examples of simultaneous biaxial-stretching machines include pantographic type ones, screw type ones, drive motor type ones, and linear motor type ones, and preferable machines are drive motor type ones and linear motor type ones which allow the stretching ratio to be changed to any ratio and allow relaxation treatment to be carried out anywhere. The stretching ratio varies depending on the kind of the resin, and is usually preferably 6 to 50 times in terms of areal magnification, and a ratio of 8 to 30 times is particularly preferably used in terms of areal magnification in a case where polyethylene terephthalate is used as any one of the resins that are components of the reflective film. In particular, in simultaneous biaxial-stretching, it is preferable to employ the same stretching ratio for the longitudinal direction and the width direction and in addition, to employ substantially the same stretching speed, in order to suppress the in-plane orientation difference. In addition, the stretching temperature is preferably between the glass transition temperature of the resin that is a component of the reflective film and the glass transition temperature plus +120° C.

Subsequently, the thus biaxially-stretched film is preferably heat-treated at a temperature between the stretching temperature and the melting point in the tenter in order to obtain flatness and dimensional stability. During this heat-treatment, it is preferable to carry out relaxation treatment in the longitudinal direction instantaneously just before and/or just after entry into a heat-treatment zone in order to suppress the distribution of the primary orientation axis in the width direction. The thus heat-treated film is slowly cooled uniformly, cooled to room temperature, and wound up. If necessary, relaxation treatment may be applied in the longitudinal direction and/or the width direction in steps from heat-treatment to slow cooling. Relaxation treatment is carried out in the longitudinal direction instantaneously just before and/or just after entry into a heat-treatment zone.

The surface of the obtained reflective film is also preferably formed into a concavo-convex shape in the following manner. Examples of methods of forming a concavo-convex shape include (a) a mold transfer method based on use of a mold, (b) a method in which the surface of a base material is directly processed, and the like. More specifically, examples of (a) mold transfer methods include: (a1) a method in which a shape is formed by pressing and crimping a mold while the mold and/or the above-mentioned base material are/is heated; (a2) a method in which a shape is formed by laminating a photo-curing or thermosetting resin on the surface of the base material, pressing a mold onto the surface, and allowing the resin to be cured by activated energy ray irradiation or heating; (a3) a method in which a resin preliminarily filled in the concave portion of a mold is transferred onto a base material; and the like.

Examples of (b) methods of directly processing the surface of a base material include: (b1) a method in which the surface is mechanically cut into a desired shape using a cutting tool or the like; (b2) a method in which the surface is cut by a sand blast method; (b3) a method in which the surface is cut by laser; (b4) the surface of a base material is processed into a desired shape by laminating a photo-curing resin onto the surface of the base material and applying a technique such as lithography or optical interference exposure; and the like.

Among these, (a) a mold transfer method is a more preferable production method from the viewpoint of productivity, but it is possible to combine these processes, and selecting processes as appropriate makes it possible to obtain a reflective film having a desired concavo-convex shape.

<Sticking Reflective Film and Color Conversion Material Together>

In the present invention, the first reflective film and the color conversion material can be integrally stuck together with a color conversion material adhesive layer in between.

In addition to this, the light source unit according to the present invention may have an optical film such as a reflective film, light-guiding plate, diffusion plate, diffusion film, light-collecting film, and polarized reflective film.

<Light Source Unit>

The light source unit according to the present invention is configured to include at least a light source, a first reflective film, and a color conversion material. The arrangement of the light source and the color conversion material is not limited to a particular one as long as the configuration is such that the reflective film is included between the light source and the color conversion film. The configuration may be such that the color conversion material may be applied to a film or glass that is separated from the light source or may be used as a substitute for a color filter.

The light source unit according to the present invention can be used in applications such as displays, lighting, interiors, signs, and sign boards, and are particularly preferred for use in display and lighting applications in particular.

EXAMPLES

Below, the present invention will be described with reference to Examples, but the present invention is not to be limited to these Examples.

<Measurement of Light Emission Intensity and Light Emission Bandwidth of Light Source>

Light from the light source was measured using a mini-spectrometer (C10083MMD) made by Hamamatsu Photonics K.K., with an optical fiber having an NA of 0.22 attached to the mini-spectrometer. The wavelength showing the largest intensity of the obtained light emission spectrum was regarded as a light emission peak wavelength of the light source, and a light emission bandwidth showing an intensity of 50% or more of the light emission intensity at the light emission peak wavelength of the light source was regarded as the light emission bandwidth of the light source.

<Measurement of Light Emission Intensity and Bandwidth of Light from Color Conversion Material>

Light from the the color conversion material which had been irradiated with light from the light source was measured using a mini-spectrometer (C10083MMD) made by Hamamatsu Photonics K.K., with an optical fiber having an NA of 0.22 attached to the mini-spectrometer. Using the obtained light emission spectrum, the wavelength showing the largest intensity among the wavelengths excluding the light emission peak wavelength of the light source was regarded as the peak wavelength (peak wavelength 1) of the light from the color conversion material, and a band showing an intensity of 50% or more of the intensity at the peak wavelength of the light from the color conversion material was regarded as the bandwidth of the light from the color conversion material. In this regard, the color conversion material used in the present application had a maximum point in addition to the peak wavelength of the light from the color conversion material defined above, and accordingly, the wavelength of the maximum point was regarded as a second light emission peak wavelength (peak wavelength 2).

<Measurement of Reflectance and Reflection Bandwidth of Reflective Film>

To a spectrophotometer (U-4100) made by Hitachi, Ltd., the accessory angle variable transmission device and the accessory polarizer made by Glan-Taylor are attached, and the reflectances of P-Polarized light and S-Polarized light having a wavelength of 250 to 1600 nm at incident angles Φ of 10 degrees, 20 degrees, 30 degrees, 40 degrees, and 60 degrees and the transmittances in the wavelengths from 250 to 1600 nm at an incident angle 9 of 0 degrees were measured. Measurement conditions: the slit was 2 nm (for visible)/automatic control (for infrared), and the gain was set to 2, and the scanning rate was set to 600 nm/min. With 65 inches envisaged, samples, 5 cm×10 cm, were cut out at 45 cm intervals from the longitudinal direction of the film and at 70 cm intervals from the width direction of the film, and were measured. The reflectances on both sides of the film were measured, and the result showing a higher reflectance was regarded as the reflectance. Each parameter was determined by the below-mentioned method.

<Short wavelength end and Long wavelength end, λ1 and λ2, of Reflective Film>

From the reflection spectra obtained above, the average reflection spectrum was calculated using the average value of the P-Polarized light and S-Polarized light for each wavelength, the wavelength that is the lowest wavelength of the wavelengths corresponding to Rmax/2(%) or more and is 400 nm or more is regarded as the short wavelength end of the reflection bandwidth of the reflective film, and the wavelength that is the longest wavelength of the wavelengths corresponding to Rmax/2(%) or more and is 1600 nm or less is regarded as the long wavelength end of the reflection bandwidth of the reflective film, wherein Rmax (%) is the largest reflectance in the wavelengths from 400 to 1600 nm. Similarly, the wavelength that is Rmax/4(%) at or near the lowest wavelength end is defined as λ1, and the wavelength that is Rmax×¾ is defined as λ2.

<Average Transmittance in Light Emission Bandwidth of Light Source>

From the transmission spectra obtained above, the average transmittance spectrum was calculated using the average value of the P-Polarized light and S-Polarized light for each wavelength, and with respect to this average transmittance spectrum, the average transmittance in the wavelength range corresponding to the light emission bandwidth of the light source determined above was calculated.

<Reflectance of P-Polarized light in Light Emission Bandwidth of Light Source>

From the reflection spectra obtained above, the average reflectance was calculated, with respect to the reflection spectrum of the P-Polarized light, in the wavelength range corresponding to the light emission bandwidth of the light source determined above.

<Largest and Average Reflectances in Bandwidth of Light from Color Conversion Material>

From the reflection spectra obtained above, the average reflection spectrum was calculated using the average value of the P-Polarized light and S-Polarized light for each wavelength, and with respect to this average reflection spectrum, the largest reflectance and the average reflectance in the wavelength range corresponding to the bandwidth of the light from the color conversion material determined above were calculated.

<Correlation Coefficient>

From the reflection spectra obtained above, the average reflection spectrum was calculated using the average value of the P-Polarized light and S-Polarized light for each wavelength, and with respect to each of the film samples from the ends in the film width direction and in the film longitudinal direction, correlation coefficients with the center of the film sample in a 400 to 800 nm wavelength section of the average reflection spectrum were calculated to obtain four correlation coefficients. The correlation coefficient that was the smallest value of these was regarded as the smallest value of the correlation coefficients.

<Measurement of Luminance>

A light source unit of Kindle Fire HDX 7 was used as a light source unit including a light source for evaluation. The light emission bandwidth of the backlight was 440 to 458 nm. With this light source unit, a light source unit was configured to include the accessory light-guiding plate, a white color reflective film (E60L) including voids, made by Toray Industries, Inc., a color conversion material (alternatively a laminate member including a reflective film and a color conversion material), the accessory prism film, and the accessory polarized reflective film, and the luminance of the light source unit was measured using CA-2000 (Konica Minolta, Inc.) with the accessory CCD camera disposed at a position 90 cm from the backlight surface and facing the light source unit face, to carry out comparison and pass-fail judgement in accordance with the following indices. In addition, half of the display was masked with a black color film (100×30) made by Toray Industries, Inc., and a luminance ratio of the unmasked portion to the masked portion was used to judge the contrast in accordance with the following criteria.

Luminance Ununiformity

●: 1% or less difference in luminance relative to blank at five points in plane

○: 2% or less difference in luminance relative to blank at five points in plane x: more than 2% difference in luminance relative to blank at five points in plane Contrast ●: 1000 or more as luminance of unmasked portion/luminance of masked portion ○: 500 or more as luminance of unmasked portion/luminance of masked portion x: 500 or less as luminance of unmasked portion/luminance of masked portion <Light Resistance Test>

A light source unit of Kindle Fire HDX 7 was used as a light source unit including a light source for evaluation and tested in a 50° C. atmosphere under the conditions of the lighted light source for 1000 hours, the color shade and luminance before and after the test were evaluated using a spectral radiance meter made by Konica Minolta Sensing Inc., and the haze was evaluated using a haze meter (HGM-2DP) made by Suga Test Instruments Co., Ltd. The judgement criteria are as follows.

●: between before and after the test, Δu'v' is less than 0.01, a change in luminance is less than 1%, and A-haze is less than 1.5%.

○: between before and after the test, Δu'v' is less than 0.02, a change in luminance is less than 5%, and A-haze is less than 1.5%.

x: between before and after the test, Δu'v' is 0.02 or more, a change in luminance is 5% or more, and A-haze is 1.5% or more.

Synthesis Example 1

Synthesis Method of Green Color Conversion Substance G-1

To a flask, 3,5-dibromobenzaldehyde (3.0 g), 4-t-butylphenylboronic acid (5.3 g), tetrakis(triphenylphosphine)palladium(0) (0.4 g), and potassium carbonate (2.0 g) were added, and the flask was then purged with nitrogen. To this, degassed toluene (30 mL) and degassed water (10 m L) were added, and the resulting mixture was refluxed for four hours. The reaction solution was cooled to room temperature, and the organic layer was separated and washed with saturated brine. This organic layer was dried over magnesium sulfate and filtrated, followed by distilling off the solvent. The resulting reaction product was purified by silica gel chromatography to obtain 3,5-bis(4-t-butylphenyl)benzaldehyde (3.5 g) as a white solid.

To the reaction solution, 3,5-bis(4-t-butylphenyl)benzaldehyde (1.5 g) and 2,4-dimethylpyrrole (0.7 g) were added, and dehydrated dichloromethane (200 mL) and trifluoroacetic acid (one drop) were added, and the resulting mixture was stirred under a nitrogen atmosphere for four hours. To this, a dehydrated dichloromethane solution of 2,3-dichloro-5,6-dicyano-1,4-benzoquinone (0.85 g) was added, and the resulting mixture was further stirred for one hour. After completion of the reaction, bromine trifluoride diethyl ether complex (7.0 mL) and diisopropylethylamine (7.0 mL) were added, the resulting mixture was stirred for four hours, water (100 mL) was further added, the resulting mixture was stirred, and the organic layer was separated. This organic layer was dried over magnesium sulfate and filtrated, followed by distilling off the solvent. The resulting reaction product was purified by silica gel chromatography to obtain 0.4 g of the below-mentioned compound G-1 (yield of 18%).

Synthesis Example 2

Synthesis Method of Red Color Conversion Substance R-1

A solution mixture of 300 mg of 4-(4-t-butylphenyl)-2-(4-methoxyphenyl)pyrrole, 201 mg of 2-methoxybenzoylchloride, and 10 ml of toluene was heated under a nitrogen gas stream at 120° C. for six hours. The mixture was cooled to room temperature and evaporated. The mixture was washed with 20 ml of ethanol and dried in vacuo to obtain 260 mg of 2-(2-methoxybenzoyl)-3-(4-t-butylphenyl)-5-(4-methoxyphenyl)pyrrole.

A solution mixture of 260 mg of 2-(2-methoxybenzoyl)-3-(4-t-butylphenyl)-5-(4-methoxyphenyl)pyrrole, 180 mg of 4-(4-t-butylphenyl)-2-(4-methoxyphenyl)pyrrole, 206 mg of methanesulfonic acid anhydride, and 10 ml of degassed toluene was heated under a nitrogen gas stream at 125° C. for seven hours. The mixture was cooled to room temperature, 20 ml of water was added, and the resulting mixture was extracted with 30 ml of dichloromethane. The organic layer was washed with 20 ml of water twice, evaporated, and dried in vacuo.

Then, to a solution mixture of the resulting pyrromethene body and 10 ml of toluene, 305 mg of diisopropylethylamine, and 670 mg of boron trifluoride diethyl ether complex were added under a nitrogen gas stream, and the resulting mixture was stirred at room temperature for three hours. To the mixture, 20 ml of water was added, and the resulting mixture was extracted with 30 ml of dichloromethane. The organic layer was washed with 20 ml of water twice, dried over magnesium sulfate, and evaporated. The resulting product was purified by silica gel column chromatography and dried in vacuo to obtain 0.27 g of reddish violet powder.

Example 1

Reflective films were obtained by the below-mentioned method.

As a thermoplastic resin A, polyethylene naphthalate (PEN) was used. In addition, ethylene terephthalate copolymerized with cyclohexane dimethanol, wherein the copolymer (PETG) is a non-crystalline resin having no melting point, was used as a thermoplastic resin B. Crystalline polyester that had been made ready for use and the thermoplastic resin B were individually fed into two single screw extruders, melted at 280° C., and kneaded. Next, they were each passed through five FSS type leaf disk filters and were merged by a laminating device having 11 slits while being weighed by a gear pump, such that they were alternately laminated in 11 layers in the thickness direction to form a laminate, wherein the device was designed such that the thickness of the outermost surface layer was 5% of that of the film. The method of making a laminate was performed in accordance with the description of Paragraphs [0053] to [0056] of JP 2007-307893 A. In this process, the slit lengths and intervals were all constant. The obtained laminate included six layers of the thermoplastic resin A and five layers of the thermoplastic resin B and had a laminated structure of layers alternately laminated in the thickness direction. A value obtained by dividing a film width direction length of a die lip by a film width direction length at an inflow port of the die as a widening ratio inside the die was set to 2.5.

The obtained cast film was heated by a roller group set at 130° C., was then stretched 3.3-fold in the film longitudinal direction in a stretching section length of 100 mm while being rapidly heated by radiation heaters from both sides of the film, and was then once cooled. Subsequently, the both sides of this uniaxially stretched film were subjected to corona discharge treatment in the air to make the wet tension of the base film 55 mN/m. A lamination forming film coating liquid formed of (a polyester resin with a glass transition temperature of 18° C.)/(a polyester resin with a glass transition temperature of 82° C.)/(silica particles with an average particle diameter of 100 nm) was applied to the treated surfaces to form transparent, easily-slippery, and easily-adhesive layers. The refractive index of the easily-adhesive layer was 1.57.

This uniaxially stretched film was guided to a tenter, was preliminarily heated with hot air at 110° C., and was stretched 4.5-fold in the film width direction at a temperature of 130° C. The stretching speed and temperature in this process were set constant. The stretched film was subjected, as it was, to heat-treatment with hot air at 240° C. in the tenter, was then subjected to relaxation treatment by 2% in the width direction under the same temperature condition, was rapidly cooled to 100° C., was subjected to relaxation treatment by 5% in the width direction, and was then wound up to obtain a reflective film.

Color conversion materials were obtained by the below-mentioned method.

An acrylic resin 1 (SP value=9.5 (cal/cm$^3$)$^{0.5}$) was used as a binder resin, and 0.25 parts by weight of the compound G-1 as a luminous material (a) and 400 parts by weight of toluene as a solvent, relative to 100 parts by weight of the binder resin, were mixed, and then the resulting mixture was stirred and deaerated at 300 rpm for 20 minutes using a planetary stirring/deaerating device "Mazerustar KK-400" (made by Kurabo Industries Ltd.) to obtain a color conversion composition for producing the (A) layer. Similarly, a polyester resin 1 (SP value=10.7 (cal/cm$^3$)$^{0.5}$) was used as a binder resin, and 0.017 parts by weight of the compound R-1 as a luminous material (b) and 300 parts by weight of toluene as a solvent, relative to 100 parts by weight of the binder resin, were mixed, and then the resulting mixture was stirred and deaerated at 300 rpm for 20 minutes using a planetary stirring/deaerating device "Mazerustar KK-400" (made by Kurabo Industries Ltd.) to obtain a color conversion composition for producing the (B) layer.

Next, using a slit die coater, the color conversion composition for producing the (A) layer was applied onto a PET film having a thickness of 50 µm, and dried by heating at 100° C. for 20 minutes to form the (A) layer having an average film thickness of 16 µm. Similarly, using a slit die coater, the color conversion composition for producing the (B) layer was applied onto the PET base layer side of a light diffusion film, "Chemical Matte" 125PW (made by Kimoto Co., Ltd., thickness: 138 µm), as a base layer, and dried by heating at 100° C. for 20 minutes to form the (B) layer having an average film thickness of 48 µm.

Next, the above-mentioned two units were laminated by heating, such that the (A) layer and the (B) layer were directly laminated, to obtain a color conversion material.

The evaluation results of the light source unit including the obtained reflective film and the color conversion material are shown in Table 1, and the luminance is slightly enhanced, compared with Comparative Example 1 in which no reflective film was used.

Example 2

As a thermoplastic resin A, polyethylene terephthalate (PET) having a melting point of 258° C. was used. In addition, a cast film was obtained in the same manner as in Example 1 except that ethylene terephtalate copolymerized with 25 mol % of spiroglycol and 30 mol % of cyclohexane dicarboxylic acid, wherein the copolymer (PE/SPG-T/CHDC) is a non-crystalline resin having no melting point, was used as a thermoplastic resin B, and that a reflective film formed from 51 layers of A layer composed of the thermoplastic resin A and 50 layers of B layer composed of the thermoplastic resin B was used.

The obtained cast film was heated by a roller group set at 72 to 78° C., was then stretched 3.3-fold in the film longitudinal direction in a stretching section length of 100 mm while being rapidly heated by radiation heaters from both sides of the film, and was then once cooled. Subsequently, the both sides of this uniaxially stretched film were subjected to corona discharge treatment in the air to make the wet tension of the base film 55 mN/m. A lamination forming film coating liquid formed of (a polyester resin with a glass transition temperature of 18° C.)/(a polyester resin with a glass transition temperature of 82° C.)/(silica particles with an average particle diameter of 100 nm) was applied to the treated surfaces to form transparent, easily-slippery, and easily-adhesive layers. The refractive index of the easily-adhesive layer was 1.57.

This uniaxially stretched film was guided to a tenter, was preliminarily heated with hot air at 110° C., and was stretched 4.5-fold in the film width direction at a temperature of 130° C. The stretching speed and temperature in this process were set constant. The stretched film was subjected, as it was, to heat-treatment with hot air at 240° C. in the tenter, was then subjected to relaxation treatment by 2% in the width direction under the same temperature condition, was rapidly cooled to 100° C., was subjected to relaxation treatment by 5% in the width direction, and was then wound up to obtain a reflective film.

The evaluation results of the obtained reflective film, color conversion material, and light source unit including these are shown in Table 1, and this Example exhibits remarkable enhancement in luminance, compared with Example 1 in which the number of layers was smaller.

Example 3

A reflective film and a color conversion material were obtained in the same manner as in Example 2 except that the number of A layers composed of the thermoplastic resin A was 101, and the layer thickness of B layers composed of the thermoplastic resin B was 100 layers.

The evaluation results of the obtained reflective film, color conversion material, and light source unit including these are shown in Table 1, and this Example exhibits further enhancement in luminance, compared with Example 2 in which the number of layers was smaller.

Example 4

A reflective film and a color conversion material were obtained in the same manner as in Example 2 except that the number of A layers composed of the thermoplastic resin A was 301, and the layer thickness of B layers composed of the thermoplastic resin B was 300 layers.

The evaluation results of the obtained reflective film, color conversion material, and light source unit including these are shown in Table 1, and this Example exhibits remarkable enhancement in luminance.

Example 5

A reflective film and a color conversion material were obtained in the same manner as in Example 4 except that the reflection bandwidth of the reflective film had longer wavelengths than in Example 1 and that the reflective film was adjusted so as to transmit light from the light source incident on the film surface at an incident angle of 30°.

The evaluation results of the obtained reflective film, color conversion material, and light source unit including these are shown in Table 1, and a slight decrease in luminance was exhibited in the frontal measurement of luminance because the reflection bandwidth was shifted to a longer wavelength side than in Example 4.

Example 6

A reflective film and a color conversion material were obtained in the same manner as in Example 4 except that a laminate film (a third reflective film) having 601 layers and exhibiting the following characteristics was inserted between the light-guiding plate and the second reflective film.

Long wavelength end: 570 nm or less
Average reflectance (incidence at 10°) in light emission bandwidth of light source: 91%
Average transmittance (incidence at 60°) in light emission bandwidth of light source: 81%

The evaluation results of the obtained reflective film, color conversion material, and light source unit including these are shown in Table 1, and the insertion of the third reflective film further enhanced the frontal luminance, and furthermore, improved the ununiformity of the in-plane luminance.

Example 7

A reflective film and a color conversion material were obtained in the same manner as in Example 4 except that the stretching ratio of the reflective film in the film width direction was changed to 3.5 times.

The evaluation results of the obtained reflective film, color conversion material, and light source unit including these are shown in Table 1, and the same level of luminance enhancement effect as in Example 4 was exhibited. On the other hand, the luminance ununiformity exhibited a tendency to be slightly larger than in Example 4, reflecting the short wavelength end of the reflective film, the average reflectance, and a decrease in correlation coefficient.

Example 8

A reflective film, and a color conversion material were obtained in the same manner as in Example 4 except that the thickness of the surface layer of the reflective film was 3% relative to the film thickness.

The evaluation results of the obtained reflective film, color conversion material, and light source unit including these are shown in Table 1, and the same level of luminance enhancement effect as in Example 4 was exhibited. On the other hand, the luminance ununiformity exhibited a tendency to be larger than in Example 4, reflecting the short wavelength end of the reflective film, the average reflectance, and a decrease in correlation coefficient.

Example 9

A reflective film and a color conversion material were obtained in the same manner as in Example 4 except that the thickness of the surface layer of the reflective film was 0.5% relative to the film thickness and that the stretching ratio of the reflective film in the film width direction was changed to 3.5 times.

The evaluation results of the obtained reflective film, color conversion material, and light source unit including these are shown in Table 1, and a luminance enhancement effect was exhibited although the effect was slightly lower than in Example 4, and on the other hand, the luminance ununiformity exhibited a tendency to be larger than in Example 4, reflecting the short wavelength end of the reflective film, the average reflectance, and a decrease in correlation coefficient.

Example 10

A light source unit was obtained in the same manner as in Example 4 except that, as the second reflection film, the ESR made by 3M Japan Limited and having no void was used in place of a white reflective film (E60L) made by Toray Industries, Inc. and having voids. The results are shown in Table 1, and the luminance had a tendency to decrease, reflecting a difference that the second reflective film had in reflective behavior.

Example 11

A light source unit was obtained in the same manner as in Example 4 except that, as a light source, the light source used for the KD-65X9500B that is a TV set made by Sony Corporation was used. The results are shown in Table 1, and the luminance had a tendency to increase, reflecting a difference that the second reflective film had in reflective behavior.

Example 12

A reflective film and a color conversion material were obtained in the same manner as in Example 4 except that, as an ultraviolet absorber, a benzotriazole ultraviolet absorber (2,2'-methylenebis(4-(1,1,3,3-tetramethylbutyl)-6-(2H-benzotriazole-2-yl)phenol) having a molecular weight of 650 g/mol and the maximum absorption wavelength of 346 nm was added to the thermoplastic resin B such that the ultraviolet absorber content was 7.5 wt % relative to the whole thermoplastic resin B.

The evaluation results of the obtained color conversion material and light source unit are shown in Table 1. The same level of luminance enhancement effect as in Example 4 was exhibited, and no remarkable change in luminance and color was exhibited even after the light resistance test.

Example 13

A reflective film and a color conversion material were obtained in the same manner as in Example 4 except that a triazine ultraviolet absorber (2,4,6-tris(2-hydroxy-4-hexyloxy-3-methylphenyl)-s-triazine) having a molecular weight of 700 g/mol and the maximum absorption wavelength of 355 nm was added to the thermoplastic resin B such that the ultraviolet absorber content was 6 wt % relative to the whole thermoplastic resin B.

The evaluation results of the obtained color conversion material and light source unit are shown in Table 1. The same level of luminance enhancement effect as in Example 4 was exhibited, and no difference was recognized from the untested light source unit even after the light resistance test.

Example 14

A reflective film and a color conversion material were obtained in the same manner as in Example 4 except that a triazine ultraviolet absorber (2,4,6-tris(2-hydroxy-4-hexyloxy-3-methylphenyl)-s-triazine) (0.4 wt % relative to the whole thermoplastic resin B) and a benzotriazole ultraviolet absorber (2,2'-methylenebis(4-(1,1,3,3-tetramethylbutyl)-6-(2H-benzotriazole-2-yl)phenol)(0.4 wt % relative to the whole thermoplastic resin B) were added to the thermoplastic resin B.

To the obtained reflective film, a hard coat agent was uniformly applied, using a bar coater, wherein the hard coat agent was prepared by adding an indole dye having the maximum absorption wavelength of 393 nm to an activated energy ray curable acrylic resin (AICAAITRON Z-850 [refractive index: 1.518] made by Aica Kogyo Co., Ltd.), such that the dye content was 3 wt % relative to the whole resin composition constituting a layer composed of a curable resin. The solid content of the hard coat agent was suitably adjusted by adding a methylethyl ketone solvent such that the content was 30 wt % in total. After the prepared hard coat agent was applied using a wire bar, the agent was dried for one to two minutes in an oven maintained at 80° C., to volatilize the methylethylketone solvent, and then, the agent was cured by irradiation with ultraviolet rays using a light-collecting high-pressure mercury lamp (H04-L41 made by EYE Graphics Co., Ltd.) having an irradiation intensity of 120 W/cm$^2$ and set at a height of 13 cm from the surface of the curable resin layer, such that the cumulative irradiation intensity was 180 mJ/cm2, to obtain a reflective film wherein a hard coat layer having a coating thickness of 2 μm was laminated on the reflective film.

The evaluation results of the obtained color conversion material and light source unit are shown in Table 1. The same level of luminance enhancement effect as in Example 4 was exhibited, and no difference was recognized from the appearance and state of the untested unit even after the light resistance test.

Comparative Example 1

A light source unit was formed using the color conversion material in the same manner as in Example 1 except that no reflective film was used in the configuration.

The evaluation results of the light source unit are shown in Table 1, and the luminance was lower than in any one of Examples 1 to 7.

Comparative Example 2

A reflective film and a color conversion material were obtained in the same manner as in Example 4 except that the reflection bandwidth of the reflective film had shorter wavelengths than in Example 1 and that the reflective film was adjusted so as to reflect part of light from the light source incident on the film surface at an incident angle of 0°.

The evaluation results of the obtained reflective film, color conversion material, and light source unit including these are shown in Table 1, and the luminance was significantly lower, reflecting a decrease in the transmittance of light from the light source in the direction perpendicular to the film surface.

Comparative Example 3

A reflective film and a color conversion material were obtained in the same manner as in Example 4 except that the reflection bandwidth of the reflective film had longer wavelengths than in Example 1 and that the reflective film was adjusted so as to transmit light from the light source incident on the film surface at an incident angle of 60°.

The evaluation results of the obtained reflective film, color conversion material, and light source unit including these are shown in Table 1, and no frontal luminance enhancement effect was recognized because light from the light source was transmitted irrespective of the incident angle.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Light Source | Light Emission Bandwidth | nm | | | | | 430-485 | | | | |
| Color Conversion Material | Bandwidth of Light from Color Conversion Material | nm | | | | | 505-654 | | | | |
| | Peak Wavelength 1 | nm | | | | | 515 | | | | |
| | Peak Wavelength 2 | nm | | | | | 631 | | | | |
| Reflective Film | Ratio of Layer Surface Thickness to Film Thickness | % | 5 | 5 | 5 | 5 | 5 | 5 | 5 | 3.5 | 1 |
| | Short wavelength end | Incident Angle of 10° nm | 491 | 488 | 485 | 493 | 516 | 493 | 494 | 495 | 501 |
| | | Incident Angle of 30° nm | 471 | 472 | 471 | 474 | 498 | 474 | 475 | 476 | 482 |
| | | Incident Angle of 60° nm | 420 | 416 | 414 | 423 | 442 | 423 | 424 | 425 | 430 |
| | Long wavelength end | Incident Angle of 10° nm | 578 | 583 | 588 | 811 | 815 | 811 | 809 | 815 | 803 |
| | | Incident Angle of 60° nm | 498 | 502 | 506 | 699 | 702 | 699 | 698 | 702 | 690 |
| | λ1 | Incident Angle of 10° nm | 480 | 478 | 473 | 479 | 502 | 479 | 480 | 463 | 461 |
| | λ2 | Incident Angle of 10° nm | 498 | 493 | 490 | 500 | 528 | 500 | 501 | 511 | 512 |
| | Average Transmittance in Light Emission Bandwidth of Light Source | Incident Angle of 0° % | 91 | 91 | 91 | 91 | 91 | 91 | 91 | 91 | 91 |
| | Reflectance of P-wave in Light Emission Bandwidth of Light Source | Incident Angle of 20° % | 15 | 17 | 18 | 18 | 10 | 18 | 18 | 18 | 18 |
| | | Incident Angle of 40° % | 23 | 35 | 40 | 56 | 35 | 56 | 56 | 56 | 57 |
| | | Incident Angle of 60° % | 38 | 55 | 66 | 98 | 85 | 98 | 98 | 98 | 98 |

TABLE 1-continued

| | | | | | | | | | | | |
|---|---|---|---|---|---|---|---|---|---|---|---|
| | Largest Reflectance in Bandwidth of Light from Color Conversion Material | Incident Angle of 10° | % | 64 | 84 | 96 | 97 | 97 | 97 | 97 | 98 | 97 |
| | Average Reflectance in Bandwidth of Light from Color Conversion Material | Incident Angle of 10° | % | 38 | 55 | 65 | 96 | 96 | 96 | 96 | 95 | 95 |
| | | Incident Angle of 60° | % | 16 | 14 | 15 | 98 | 98 | 98 | 98 | 98 | 98 |
| | Difference between Largest Value and Smallest Value of Short wavelength end of Reflective Film | Longitudinal Direction (Film Width Direction) | nm | 19 | 19 | 20 | 19 | 18 | 19 | 24 | 29 | 45 |
| | | Transverse Direction (Film Longitudinal Direction) | nm | 11 | 10 | 11 | 8 | 10 | 8 | 21 | 23 | 32 |
| | Difference between Largest Value and Smallest Value of Average Reflectances of Reflection Bandwidth of Reflective Film | Longitudinal Direction (Film Width Direction) | % | 6 | 5 | 5 | 4 | 6 | 4 | 5 | 11 | 13 |
| | | Transverse Direction (Film Longitudinal Direction) | % | 3 | 1 | 3 | 2 | 2 | 2 | 1 | 2 | 2 |
| | Smallest Value of Correlation Coefficient between Film Center and Four Points: Both Ends in Longitudinal Direction and Transvers Direction | | — | 0.90 | 0.92 | 0.94 | 0.97 | 0.96 | 0.97 | 0.88 | 0.79 | 0.77 |
| | Largest Transmittance | Wavelength of 300 to 380 nm | % | 79 | 78 | 75 | 73 | 73 | 73 | 73 | 73 | 73 |
| | | Wavelength of 380 to 410 nm | % | 82 | 80 | 81 | 81 | 81 | 81 | 81 | 81 | 81 |
| | Largest Reflectance | Wavelength of 300 to 410 nm | % | 25 | 35 | 40 | 42 | 42 | 42 | 42 | 42 | 42 |
| Frontal Luminance | | | | 103 | 105 | 108 | 114 | 108 | 120 | 109 | 111 | 109 |
| In-plane Luminance Ununiformity | | | | ○ | ○ | ○ | ○ | ○ | ● | ○ | x | x |
| Contrast | | | | ○ | ○ | ● | ● | ● | ● | ● | ● | ● |
| Light Resistance Test | | | | x | x | x | x | x | x | x | x | x |

| | | | | Example 10 | Example 11 | Example 12 | Example 13 | Example 14 | Comparative Example 1 | Comparative Example 2 | Comparative Example 3 |
|---|---|---|---|---|---|---|---|---|---|---|---|
| Light Source | Light Emission Bandwidth | | nm | | | | | 430-485 | | | |
| Color Conversion Material | Bandwidth of Light from Color Conversion Material | | nm | | | | | 505-654 | | | |
| | Peak Wavelength 1 | | nm | | | | | 515 | | | |
| | Peak Wavelength 2 | | nm | | | | | 631 | | | |
| Reflective Film | Ratio of Layer Surface Thickness to Film Thickness | | % | 5 | 5 | 5 | 5 | 5 | — | 5 | 5 |
| | Short wavelength end | Incident Angle of 10° | nm | 493 | 493 | 492 | 494 | 489 | — | 461 | 581 |
| | | Incident Angle of 30° | nm | 474 | 474 | 473 | 476 | 470 | — | 442 | 558 |
| | | Incident Angle of 60° | nm | 423 | 423 | 422 | 725 | 419 | — | 394 | 495 |
| | Long wavelength end | Incident Angle of 10° | nm | 811 | 811 | 809 | 813 | 809 | — | 770 | 814 |
| | | Incident Angle of 60° | nm | 699 | 699 | 698 | 700 | 597 | — | 664 | 701 |

TABLE 1-continued

| | | | | | | | | | |
|---|---|---|---|---|---|---|---|---|---|
| λ1 | Incident Angle of 10° | nm | 479 | 479 | 478 | 480 | 477 | — | 441 | 567 |
| λ2 | Incident Angle of 10° | nm | 500 | 500 | 498 | 501 | 496 | — | 473 | 593 |
| Average Transmittance in Light Emission Bandwidth of Light Source | Incident Angle of 0° | % | 91 | 91 | 91 | 91 | 91 | — | 67 | 91 |
| Reflectance of P-wave in Light Emission Bandwidth of Light Source | Incident Angle of 20° | % | 18 | 18 | 18 | 18 | 18 | — | 34 | 10 |
| | Incident Angle of 40° | % | 56 | 56 | 55 | 56 | 56 | — | 78 | 8 |
| | Incident Angle of 60° | % | 98 | 98 | 98 | 98 | 98 | — | 98 | 4 |
| Largest Reflectance in Bandwidth of Light from Color Conversion Material | Incident Angle of 10° | % | 97 | 97 | 97 | 97 | 97 | — | 97 | 97 |
| Average Reflectance in Bandwidth of Light from Color Conversion Material | Incident Angle of 10° | % | 96 | 96 | 96 | 96 | 96 | — | 96 | 45 |
| | Incident Angle of 60° | % | 98 | 98 | 98 | 98 | 98 | — | 98 | 97 |
| Difference between Largest Value and Smallest Value of Short wavelength end of Reflective Film | Longitudinal Direction (Film Width Direction) | nm | 19 | 19 | 19 | 20 | 19 | — | 17 | 19 |
| | Transverse Direction (Film Longitudinal Direction) | nm | 8 | 8 | 9 | 8 | 7 | — | 10 | 11 |
| Difference between Largest Value and Smallest Value of Average Reflectances of Reflection Bandwidth of Reflective Film | Longitudinal Direction (Film Width Direction) | % | 4 | 4 | 4 | 4 | 4 | — | 5 | 6 |
| | Transverse Direction (Film Longitudinal Direction) | % | 2 | 2 | 2 | 2 | 2 | — | 4 | 3 |
| Smallest Value of Correlation Coefficient between Film Center and Four Points: Both Ends in Longitudinal Direction and Transvers Direction | — | | 0.97 | 0.97 | 0.97 | 0.97 | 0.97 | — | 0.96 | 0.95 |
| Largest Transmittance | Wavelength of 300 to 380 nm | % | 73 | 73 | 0 | 0 | 3 | — | 73 | 79 |
| | Wavelength of 380 to 410 nm | % | 81 | 81 | 74 | 10 | 2 | — | 79 | 88 |
| Largest Reflectance | Wavelength of 300 to 410 nm | % | 42 | 42 | 31 | 19 | 16 | — | 29 | 62 |
| Frontal Luminance | | | 105 | 118 | 115 | 114 | 116 | 100 | 91 | 99 |
| In-plane Luminance Ununiformity | | | x | x | ○ | ○ | ○ | x | ○ | x |
| Contrast | | | • | • | • | • | • | x | ○ | x |
| Light Resistance Test | | | x | x | ○ | • | • | x | x | x |

REFERENCE SIGNS LIST

1 Light Source Unit
2 Light Source
3 Reflective Film
4 Color Conversion Material
5 Laminate Member
6 Light-guiding Plate
7 Second Reflective Film
8 Third Reflective Film
9 Both Ends of Reflective Film in Longitudinal Direction
10 Both Ends of Reflective Film in Transverse Direction
11 Center of Reflective Film
31 Example of Concavo-convex Shape 32 Example of Concavo-convex Shape
33 Functional Layer

The invention claimed is:

1. A light source unit comprising:
a light source;
a color conversion material that converts incident light from the light source into light having a longer wavelength than the incident light;
and a reflective film that exists between the light source and the color conversion material and that transmits light from the light source incident perpendicularly on a surface of the reflective film and reflects light from the color conversion material incident perpendicularly on the film surface of the reflective film;
wherein the reflective film satisfies;

$$R20<R40<R60$$

where R20(%), R40(%), and R60(%) are reflectance of P-Polarized light at incident angles of 20°, 40°, and 60° respectively; and
wherein the reflective film satisfies the equation (I):

$$|\lambda 1-\lambda 2|\leq 50 \qquad (I)$$

where λ1 is a wavelength (nm) at which a reflectance is ¼ of a largest reflectance at or near a lower wavelength end of a reflection bandwidth of the reflective film, and
λ2 is a wavelength (nm) at which a reflectance is ¾ of the largest reflectance at or near the lower wavelength end of the reflection bandwidth of the reflective film, and λ1<λ2.

2. The light source unit according to claim 1, wherein the reflective film is such that a short wavelength end of a reflection bandwidth of light incident at 60° on the surface of the reflective film is on the lower wavelength side of a long wavelength end of a light emission bandwidth of the light source.

3. The light source unit according to claim 1, wherein the reflective film satisfies that a difference between a largest value of wavelength and a smallest value of the short wavelength end of the reflection bandwidth is 30 nm or less at three points on the reflective film, wherein the three points comprise: the center, and both ends of the reflective film in either a longitudinal direction or a transverse direction.

4. The light source unit according to claim 1, wherein the reflective film reflects at least 30% of a light from the color conversion material incident at an angle of 60° on the surface of the reflective film.

5. The light source unit according to claim 1, further comprising a light-guiding plate that is on the opposite side of the reflective film from the color conversion material, wherein the light source is arranged on a side of the light-guiding plate.

6. The light source unit according to claim 5, comprising a second reflective film on the opposite side of the light-guiding plate from the reflective film, wherein the second reflective film includes a void.

7. The light source unit according to claim 6, comprising a third reflective film between the second reflective film and the light-guiding plate, wherein the third reflective film reflects light from the light source incident perpendicularly on the surface of the reflective film and transmits light from the light source incident on the surface of the reflective film at an angle of 60°.

8. The light source unit according to claim 1, wherein the reflective film absorbs or reflects ultraviolet rays.

9. The light source unit according to claim 8, wherein a light transmittance is 10% or less at a wavelength 20 nm lower than the short wavelength end of the light emission bandwidth of the light source of the reflective film.

10. The light source unit according to claim 1, wherein the reflective film is a laminate film formed by alternately laminating 11 or more layers of different thermoplastic resins.

11. A liquid crystal display comprising the light source unit according to claim 1 and a liquid crystal module.

12. A light source unit comprising:
a light source;
a color conversion material that converts incident light from the light source into light having a longer wavelength than the incident light;
a reflective film that exists between the light source and the color conversion material and that transmits light from the light source incident perpendicularly on the a film surface of the reflective film and reflects light from the color conversion material incident perpendicularly on the film surface of the reflective film; and
a light-guiding plate that is on the opposite side of the reflective film from the color conversion material, wherein the light source is arranged on a side of the light-guiding plate;
wherein a P-Polarized light of the light incident from the light source on the surface of the reflective film at an angle of 20°, 40°, and 60° is reflected at a reflectance of R20(%), R40(%), and R60(%) respectively, which satisfy R20<R40<R60.

13. The light source unit according to claim 12, comprising a second reflective film on the opposite side of the light-guiding plate from the reflective film, wherein the second reflective film includes a void.

14. The light source unit according to claim 13, comprising a third reflective film between the second reflective film and the light-guiding plate, wherein the third reflective film reflects light from the light source incident perpendicularly on the film surface of the reflective film and transmits light from the light source incident on the film surface of the reflective film at an angle of 60°.

* * * * *

UNITED STATES PATENT AND TRADEMARK OFFICE
CERTIFICATE OF CORRECTION

PATENT NO. : 10,732,332 B2
APPLICATION NO. : 16/344109
DATED : August 4, 2020
INVENTOR(S) : Takayuki Uto et al.

Page 1 of 1

It is certified that error appears in the above-identified patent and that said Letters Patent is hereby corrected as shown below:

In the Claims

At Claim 1 at Column 37, Line 14. The phrase, -- on the film surface of the reflective film -- should read -- on the surface of the reflective film --

Signed and Sealed this
Eighth Day of December, 2020

Andrei Iancu
*Director of the United States Patent and Trademark Office*